United States Patent [19]
Furuya et al.

[11] Patent Number: 5,838,362
[45] Date of Patent: Nov. 17, 1998

[54] IMAGE DATA READOUT TIME ADJUSTER FOR A VIDEO-ON-DEMAND SYSTEM

[75] Inventors: Shinji Furuya; Tadashi Okamoto; Ichiro Okabayashi; Shinji Sasaki, all of Osaka, Japan

[73] Assignee: Matsushita Electric Industrial Co., LTD., Kadoma, Japan

[21] Appl. No.: 539,106

[22] Filed: Oct. 4, 1995

[30] Foreign Application Priority Data

Dec. 21, 1994 [JP] Japan .................................. 6-318384

[51] Int. Cl.⁶ .................................................. H04N 7/173
[52] U.S. Cl. .................................. 348/7; 348/12; 455/4.2
[58] Field of Search .......................... 395/200.09; 348/7, 348/12, 13, 200.47, 200.48, 200.49; 455/4.2, 5.1, 6.1; 345/327; H04N 7/16, 7/173

[56] References Cited

U.S. PATENT DOCUMENTS

| | | | |
|---|---|---|---|
| 5,487,035 | 1/1996 | Nishimura et al. | 365/189.02 |
| 5,568,180 | 10/1996 | Okamoto | 348/7 |
| 5,612,790 | 3/1997 | Sakamoto et al. | 386/69 |

Primary Examiner—Chris Grant
Attorney, Agent, or Firm—Price, Gess & Ubell

[57] ABSTRACT

A data readout time adjuster to be used for a video-on-demand system includes the following units. A readout time adjusting data storage unit stores image data for adjusting readout time to be provided to subscribers who have not been assigned the readout right and are waiting for a start of a readout operation. The image data for adjusting readout time cause no inconvenience even if a transmission of the image data is interrupted any time. A readout start position check unit checks an expected time of an occurrence of the readout right and a readout start position at the expected time in response to an additional data transmission request. A readout control unit makes at least one of the readout unit and a private readout unit exclusively provided or the readout time adjusting data storage unit read the image data for adjusting readout time stored in the readout time adjusting data storage unit until the time of the occurrence of the readout right, for the subscribers who have checked the expected time and the readout start position. A readout time adjusting data transmission control unit controls the transmission unit to transmit the image data for adjusting readout time read by the readout control unit to the subscribers who are waiting for the readout right until the time of the occurrence of the readout right.

41 Claims, 36 Drawing Sheets

FIG. 2
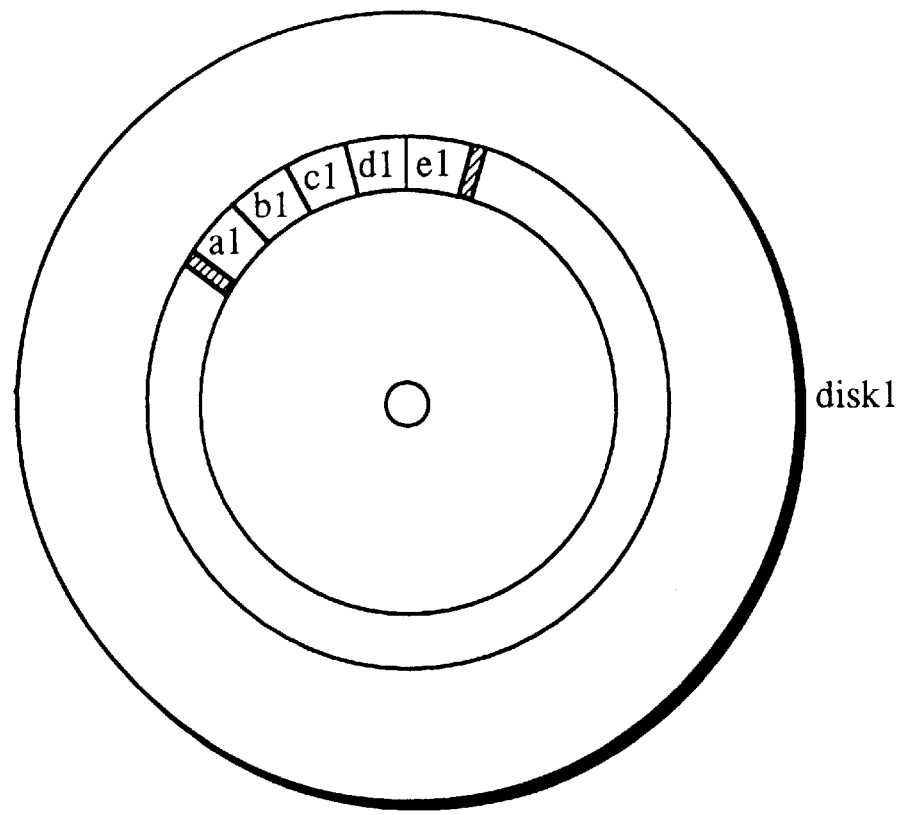
disk1
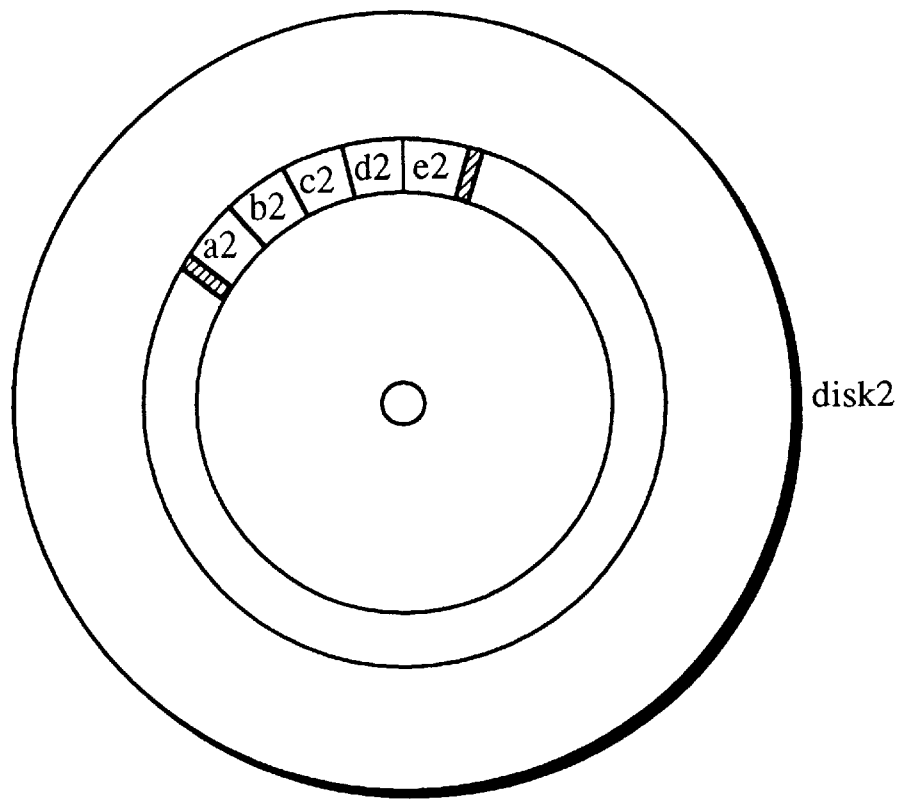
disk2

FIG. 3
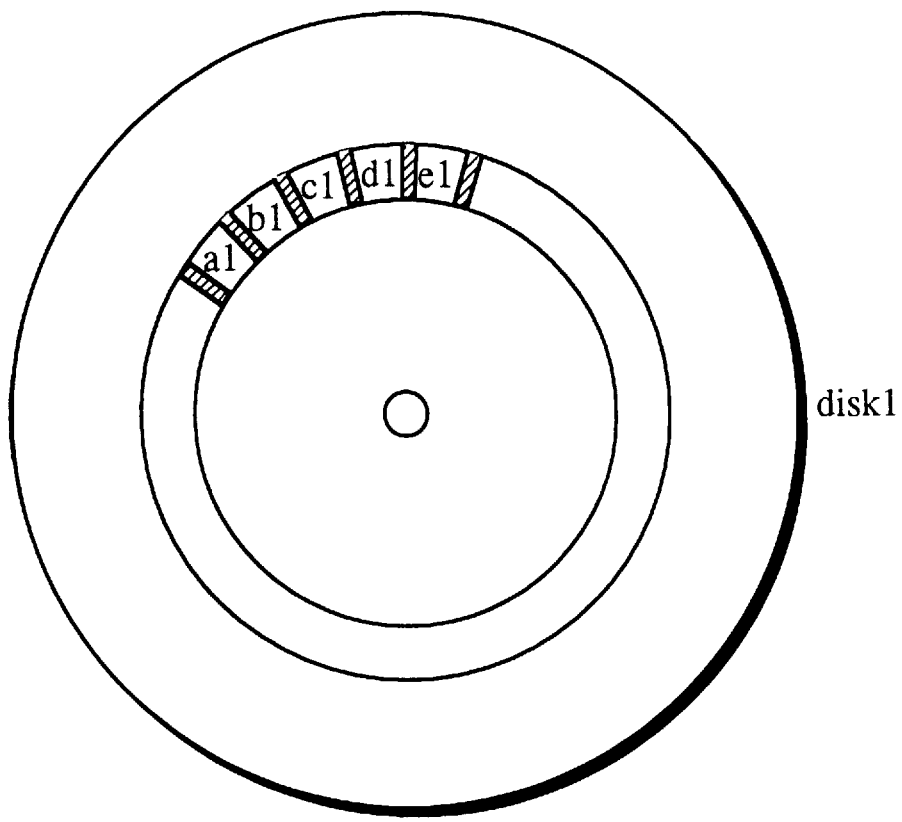
disk1
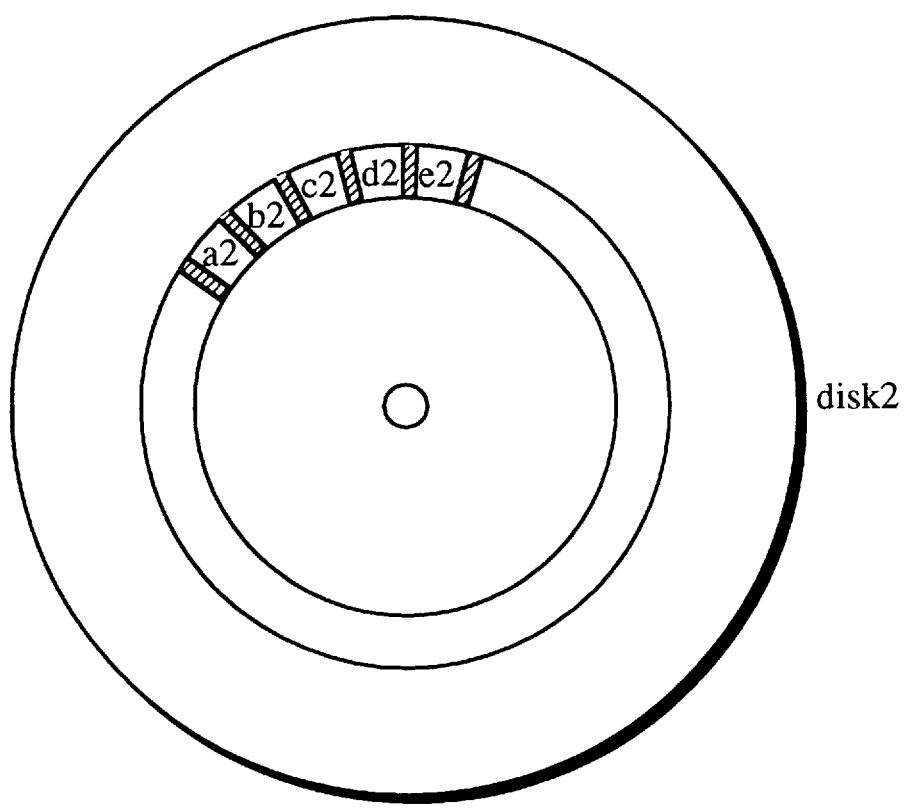
disk2

| Disks / Slots | disk1 | disk2 | disk3 | ········ | disk15 |
|---|---|---|---|---|---|
| 4 | | | | ········ | |
| 3 | U37-E13 | | U01-D31 | ········ | |
| 2 | U15-B40 | U22-A02 | U18-A33 | ········ | |
| 1 | U03-B59 | U48-E24 | U27-C17 | ········ | U19-E10 |

| Disks / Slots | disk1 | disk2 | disk3 | ········ | disk15 |
|---|---|---|---|---|---|
| 4 | | | | ········ | |
| 3 | | U37-E13 | | ········ | |
| 2 | | U15-B40 | U22-A02 | ········ | U09-H23 |
| 1 | U19-E11 | U03-B59 | U48-E24 | ········ | U11-D41 |

FIG. 8

| titles | initial image data sections | | | still pictures | | | |
|---|---|---|---|---|---|---|---|
| | disks | tracks | sections | disk 1 | disk 2 | .. | disk 15 |
| A | 1 | .. | .. | IT IS | IT IS | .. | IT IS |
| B | 2 | .. | .. | .. | .. | .. | .. |
| .. | .. | .. | .. | .. | .. | .. | .. |

FIG. 10

| Disks / Slots | 14-1 | 14-2 | 14-3 | 14-4 | ...... | 14-15 |
|---|---|---|---|---|---|---|
| 4 | | | | | | |
| 3 | U48-B10 | U54-A32 | U11-E13 | U39-A18 | ...... | |
| 2 | U29-A18 | U36-C46 | U31-D25 | U05-B35 | ...... | U45-E11 |
| 1 | U17-E43 | | U23-C31 | U41-B79 | ...... | U12-A51 |

FIG. 16 start position for movie A ↓

| Disks / Slots | 14-1 | 14-2 | 14-3 | 14-4 | ······ | 14-15 |
|---|---|---|---|---|---|---|
| 4 | | | U09-E03 | U25-C09 | ······ | |
| 3 | U48-B10 | U01-T1 | U11-E13 | U39-A18 | ······ | |
| 2 | U29-A18 | U54-A32 | U31-D25 | U05-B35 | ······ | U45-E11 |
| 1 | U17-E43 | U36-C46 | U23-C31 | U41-B79 | ······ | U12-A51 |

⇓ start position for movie A ↓

| Disks / Slots | 14-1 | 14-2 | 14-3 | 14-4 | ······ | 14-15 |
|---|---|---|---|---|---|---|
| 4 | | | | U09-A03 | ······ | |
| 3 | | U48-B10 | U01-T1 | U11-E13 | ······ | |
| 2 | U45-A12 | U29-A18 | U54-A32 | U31-D25 | ······ | U46-B19 |
| 1 | U12-A52 | U17-E43 | U36-C46 | U23-C31 | ······ | U13-C36 |

⇓ start position for movie A ↓

| Disks / Slots | 14-1 | 14-2 | 14-3 | 14-4 | ······ | 14-15 |
|---|---|---|---|---|---|---|
| 4 | | | | | ······ | |
| 3 | | | U48-B10 | U01-A01 | ······ | |
| 2 | U46-B20 | U45-A12 | U29-A18 | U54-A32 | ······ | U04-A13 |
| 1 | U13-C37 | U12-A52 | U17-E43 | U36-C46 | ······ | U02-C63 |

FIG. 23

| movieA | insertion of CM | cutting | repetition | fade-in | fade-out |
|---|---|---|---|---|---|
| | 10-D05 | 04-D07 | 03-D08 | 12-D06 | 11-D02 |
| | 14-D08 | 10-D05 | 10-D05 | 16-D13 | 14-D10 |
| | 16-D02 | 13-D14 | 12-D04 | 18-D15 | 18-D14 |
| | 18-D13 | 16-D11 | 17-D01 | 22-D05 | 21-D01 |
| | ------ | ------ | ------ | ------ | ------ |

FIG. 24
| Disks / Slots | 24-1 | 24-2 | 24-3 | 24-4 | ...... | 24-15 |
|---|---|---|---|---|---|---|
| 4 | | | U48-B10 | | ...... | |
| 3 | | | U39-A18 | | ...... | |
| 2 | ←- | U54-A32 | U05-B35 | U31-D25 | ...... | U45-E12 |
| 1 | U17-E43 | U36-C46 | U40-B79 | U23-C33 | ...... | U12-A45 |
| Disks / Slots | 24-1 | 24-2 | 24-3 | 24-4 | ...... | 24-15 |
|---|---|---|---|---|---|---|
| 4 | | | | | ...... | |
| 3 | | | U48-B10 | | ...... | |
| 2 | U40-CM | U54-A32 | U39-A18 | U31-D25 | ...... | U45-E11 |
| 1 | U17-E43 | U36-C46 | U05-B35 | U23-C31 | ...... | U12-A51 |
| Disks / Slots | 24-1 | 24-2 | 24-3 | 24-4 | ...... | 24-15 |
|---|---|---|---|---|---|---|
| 4 | | | | | ...... | |
| 3 | | | | | ...... | |
| 2 | U34-D25 | U45-E12 | U40-B79 | U54-A32 | ...... | U08-E35 |
| 1 | U29-A08 | U12-A52 | U17-E43 | U36-C46 | ...... | U40-B13 |

| Disks / Slots | 24-1 | 24-2 | 24-3 | 24-4 | ...... | 24-15 |
|---|---|---|---|---|---|---|
| 4 | | | U48-B10 | | ...... | |
| 3 | | | U39-A18 | | ...... | |
| 2 | | U54-A32 | U05-B35 | U31-D25 | ...... | U45-E11 |
| 1 | U17-E42 | U36-C46 | U40-B79 | U23-C33 | ...... | U12-A45 |

⇓

| Disks / Slots | 24-1 | 24-2 | 24-3 | 24-4 | ...... | 24-15 |
|---|---|---|---|---|---|---|
| 4 | | | | | ...... | |
| 3 | | | U48-B10 | U40-B79 | ...... | |
| 2 | | U54-A32 | U39-A18 | U31-D25 | ...... | U45-E11 |
| 1 | U17-E42 | U36-C46 | U05-B35 | U23-C33 | ...... | U12-A45 |

| Disks / Slots | 24-1 | 24-2 | 24-3 | 24-4 | ······ | 24-15 |
|---|---|---|---|---|---|---|
| 4 | | | U48-B10 | | ······ | |
| 3 | | | U39-A18 | | ······ | |
| 2 | | U54-A32 | U05-B35 | U31-D25 | ······ | U45-E11 |
| 1 | U17-E43 | U36-C46 | U40-B79 | U23-C31 | ······ | U12-A51 |

| Disks / Slots | 24-1 | 24-2 | 24-3 | 24-4 | ······ | 24-15 |
|---|---|---|---|---|---|---|
| 4 | | | | | ······ | |
| 3 | | | U40-B79 | U48-B10 | ······ | |
| 2 | U45-E11 | | U54-A32 | U39-A18 | ······ | U34-D25 |
| 1 | U12-A51 | U17-E43 | U36-C46 | U05-B35 | ······ | U29-A08 |

| Disks \ Slots | 24-1 | 24-2 | 24-3 | 24-4 | ...... | 24-15 |
|---|---|---|---|---|---|---|
| 4 | | | U48-B10 | | ...... | |
| 3 | | | U39-A18 | | ...... | |
| 2 | | U54-A32 | U05-B35 | U31-D25 | ...... | U45-E11 |
| 1 | U17-E43 | U36-C46 | U40-B79 F11 | U23-C31 | ...... | U12-A51 |

| Disks \ Slots | 24-1 | 24-2 | 24-3 | 24-4 | ...... | 24-15 |
|---|---|---|---|---|---|---|
| 4 | | | | | ...... | |
| 3 | | | U40-B79 F12 | U48-B10 | ...... | |
| 2 | U45-E12 | | U54-A32 | U39-A18 | ...... | U34-D25 |
| 1 | U12-A52 | U17-E43 | U36-C46 | U05-B35 | ...... | U29-A08 |

(b)

FIG. 37 slot table

| disks / slots | 14-1 | 14-2 | ······ | 14-15 |
|---|---|---|---|---|
| 4 | | | ······ | |
| 3 | W1-A05 | W2-B57 | ······ | W8-A35 |
| 2 | U29-A | U54-A | ······ | U45-E11 |
| 1 | U17-E9 | W3-C64 | ······ | U12-A51 | overlap subscriber table

| overlap identifiers | subscriber numbers |
|---|---|
| W1 | U-01,U-03,U-27 |
| W2 | U-24,U-33 |
| W3 | U-7,U-18 |
| ······ | ······ |

IMAGE DATA READOUT TIME ADJUSTER FOR A VIDEO-ON-DEMAND SYSTEM

BACKGROUND OF THE INVENTION (1) Field of the Invention

The present invention relates to a video-on-demand system, and more particularly to an image data readout time adjuster for the system.

(2) Related Arts

The video-on-demand system which provides subscribers with desired image data such as movies via communication lines is making remarkable progress these days, and various techniques related to the system have been developed.

For example, Japanese Laid-open Patent Application No. 63-109683 discloses an art of transmitting data whose frequencies have been multiplexed. Japanese Laid-open Patent Application No. 2-240756 discloses an art of transmitting compressed data intact up to terminals. Japanese Laid-open Patent Application No. 5-35407 discloses an art of multi-access to an automatic media converter type storage.

Conventionally, image data for movies are stored in disks by means of so-called a stripping method, which allows movies to be distributed to subscribers on request without causing apparent disconnection of the image data.

FIG. 1 shows a series of disks 1–10 which store image data for different movies. The image data for each movie are divided into image data sections each having a fixed length, and the image data sections are stored in the disks 1–10 in a manner which allows the image data sections to be read in sequence along the story of each movie.

In FIG. 2 image data sections: a1, b1, c1, d1, and e1 which respectively belong to different movies A, B, C, D, and E are stored in the same readout sector on a concentric track of the disk 1. In the same manner, the image data sections: a2, b2, c2, d2, and e2 which respectively belong to the movies A, B, C, D, and E are stored in the same sector on a concentric track of the disk 2. If any one of a1–e1 is requested by a subscriber, the rest are also read together, and only the requested one is distributed to the subscriber, and the rest are ignored.

In FIG. 3 image data sections a1–e1 are stored in individual readout sectors on a concentric track of the disk 1, and a2–e2 are stored in individual readout sectors on a concentric track of the disk 2. In this type of image data storage, only requested image data sections are read. For example, when the movies A and C are requested, a1 and c1 are read out from the disk 1 in a certain readout time period, then a2 and c2 are read from the disk 2 in the next readout time period.

According to the stripping method, even when the same movie is requested by a large number of subscribers at once, the image data sections for the movie can be read from these ten disks by shifting time. This can prevent the image data for a movie from being read sequentially from a single disk, and as a result the maximum number of subscriber who can receive the same image data at the same time can be greatly increased.

According to such a synchronous type video-on-demand system, each subscriber is assigned the right to read image data which is determined based on the time period required for reading each image data section, the readout right being effective up to the image data section corresponding to the final portion of the movie. A readout position (storage area) in a disk which stores an image data section of a movie is determined at a certain time period. Each subscriber accesses a disk which stores the next image data section every time the time period expires, as described in Japanese Laid-open Patent Application No. 4-269087. Consequently, it is necessary to administrate where in the disks (14-1) through (14-15) every image data section of each movie is stored.

FIG. 4 indicates the location of each image data section of movie A stored in the disks (14-1) through (14-15). In this case, the image data sections for the movie A are stored serially in the disks (14-1) to (14-15) starting at the disk (14-4). The image data section corresponding to the initial part of a movie is not necessarily stored in the top of the front disk (14-1).

FIG. 5 shows the contents of the slot table to be used for the administration of the readout rights and the readout positions. Each of the disks 1 through 15 has four slots, and each slot is assigned to each subscriber. For example, in the top slot table, the slot 1 in the disk 1 is assigned to a subscriber numbered U03, and the subscriber is supposed to read an image data section of the movie B from a storage area numbered B59. Each blank square indicates that the slot is currently free. The number of slots is determined from the maximum number of image data sections to be read in one readout time period.

The bottom slot table shows the contents of the slot table in the next readout time period, in which each subscriber is assigned a slot belonging to the next disk. If there is any subscriber who started or finished image data reception, necessary amendments are done. Needless to say, if the image data section following the image data section stored in the storage area numbered B59 is stored in a storage area numbered other than B59 in the disk 2, then necessary amendments are done. These procedures are shown in the flowchart of FIG. 6.

Thus, the readout of image data to each subscriber is adjusted at every readout step, based on the information held in the slot tables.

In addition, Japanese Patent Applications Nos. 6-223221 and 6-182431, which are the foundation of our U.S. patent application Ser. No. 08/509,738 disclose a method for storing divided image data, reading the stored image data, adjusting a slot table, and an unusual readout.

However, according to these conventional systems, the number of slots to be used in each disk, that is, the number of readout operations possible in one readout step is limited. Therefore, when there is no free slot in a predetermined disk, subscribers who made a request must wait for the availability of the slot. Although it is preferable not to make the subscribers bored or uncomfortable while they are waiting, no adequate countermeasures against these inconvenience have been exploited so far.

In addition, it is preferable that all the slots in each disk are evenly assigned in order to meet various demands such as reduction of time to wait for free slots and of the number of subscribers waiting for free slots, or skipping, forwarding, and rewinding operations. Therefore, upon the occurrence of unbalanced slot assignment, it is necessary to modify the assignment of time slots to subscribers, thereby correcting the unbalance. The correction requires adjusting readout time without making subscribers uncomfortable; however, no adequate countermeasures against this have been exploited so far.

When a popular movie is released, the number of request for the movie grows transiently, converging in a specific time zone depending on the contents. However, it is difficult to increase the number of disks for the movie or to give up storage area for other movies to the movie, in view of the relationship between cost and effects. No appropriate countermeasures have been taken so far, which may make subscribers irritate or uncomfortable.

Furthermore, an image data readout time adjuster for the video-on-demand system which can properly address various transmission demands is being waited; however no effective measures have been developed so far.

SUMMARY OF THE INVENTION

A first object of the present invention is to provide an image data readout time adjuster which is used for a video-on-demand system administrated with a slot table, and does not make subscribers bored or uncomfortable while they are waiting for available slots.

The first object can be achieved by a data readout time adjuster to be used for a video-on-demand system. The video-on-demand system comprising a storage unit for dividing each titled image data into a plurality of image data sections and storing each of the plurality of image data sections in one of a series of storage media in order of reproduction, returning to a first storage medium in the series after reaching a final storage medium in the series along a story of each titled image data; a readout administration unit for assigning a slot and a readout right to each subscriber who has made a data transmission request, for designating an image data storage area for each image data section, and for assigning a waiting order to each subscriber who has not been given the readout right; an update unit for updating the readout right and the readout position at a certain time interval; a readout unit for sequentially reading the plurality of image data sections from the storage media for each subscriber who has been assigned the readout right; and a transmission unit for transmitting the plurality of image data sections read to each subscriber.

The data readout adjuster comprises the following units 1)–4):

1) a readout time adjusting data storage unit for storing image data for adjusting readout time to be provided to subscribers who have not been assigned the readout right and are waiting for a start of a readout operation, the image data for adjusting readout time causing no inconvenience even if a transmission of the image data is interrupted any time;

2) a readout start position check means for, in response to an additional data transmission request, judging whether a subscriber is assigned a readout right for reading a first image data section of a titled image data requested by the additional data transmission request, wherein said readout start position check means judges that the subscriber is assigned the readout right when there is a free slot in a storage media storing the first image data section of the titled image data;

3) a readout control unit for making at least one of the readout unit and a private readout unit exclusively provided for the readout time adjusting data storage unit read the image data for adjusting readout time stored in the readout time until said readout start position check means judges that the subscriber is assigned the readout right, wherein said transmission means transmits the image data for adjusting readout time to the subscriber.

A second object of the present invention is to provide an image data readout time adjuster capable of solving unbalanced time slot assignment to subscribers, thereby addressing subscribers' request for skipping, forwarding, or rewinding operations.

The second object can be achieved by a data readout time adjuster comprising the following units 1)–8):

1) a data holding unit for holding data on a number of image data sections to be actually read from the series of storage media in one readout step on the request from subscribers, and on a permissible value of unbalance in readout, the permissible value being determined by a maximum number of image data sections to be read in one readout step;

2) an unbalance detection unit for examining conditions of the readout right and the readout position and comparing the conditions with the data on the permissible value, thereby detecting an occurrence of the unbalance in readout;

3) an image insertion position storage unit for presently storing a position to be located between two consecutive image data sections of at least one titled image data, the position allowing another image to be imposed;

4) an unbalance correcting image data storage unit for presently storing at least one type of image data for correcting the unbalance in readout;

5) an image insertion position detection unit for, when the unbalance detection unit has detected the unbalance, checking whether the two consecutive image data sections are included in image data sections which have not been read yet and belong to at least one titled image data which are being actually read from at least one storage medium which is a target of unbalance detection;

6) a readout right delay position detection unit for, in response to a detection of the two consecutive image data sections, checking whether the readout right of a storage medium which stores a latter image data section can be obtained within a predetermined delay time immediately after a former image data section has been read, and further checking whether the unbalance in the storage medium exceeds the permissible value when the readout operation is delayed for the predetermined delay time by referring to the readout administration unit;

7) a delay time calculation unit for calculating the delay time when the readout right delay position detection unit has obtained the readout right and has detected that the unbalance in the storage medium does not exceed the permissible value; and 8) an image insertion readout right position change unit for making the readout unit read the image data for correcting the unbalance from the unbalance correcting image data storage unit during the delay time calculated by the delay time calculation unit immediately after the former image data section has been read, then read the latter image data section by controlling administration and update of the readout right and the readout position.

A third object of the present invention is to provide an image data readout time adjuster capable of addressing a large number of requests for the same image data from subscribes at the same time.

The third object can be achieved by a data readout time adjuster further comprising the following units 1)–5):

1) an overlapping subscriber detection unit for detecting a plurality of subscribers for whom a same image data section of a same titled image data is read within a certain time period by referring to contents of the readout right and readout position;

2) a neighboring subscriber uniting unit for controlling the image insertion position detection unit, the readout right delay position detection unit, the delay time calculation unit, and the image insertion readout right position change unit to overlap the readout right and the readout position of the detected subscribers by at least delaying the readout right of the former subscriber and not to make the unbalance exceed the permissible value;

3) a neighboring subscriber recognition unit for controlling the readout administration unit and the update unit to assign a same readout right and a same readout position to the detected subscribers in accordance with the control of the neighboring subscriber uniting unit;

4) a duplication unit for duplicating a same number of image data sections to be read from the storage media as a number of the different subscribers; and 5) a transmission control unit for controlling the transmission unit to transmit the duplicated image data sections to each of the different subscriber.

The third object can be also achieved by a data readout time adjuster comprising the following units 1)–5):

1) an overlapping subscriber detection unit for detecting a plurality of subscribers for whom a same image data section of a same titled image data is read within a certain time period by referring to contents of the readout right and readout position;

2) a neighboring subscriber uniting unit for controlling the image effects position detection unit, the image effects change position detection unit, and the image effects readout right position change unit to overlap the readout right and the readout position of the detected subscribers by at least changing the readout right of the former subscriber and not to make the unbalance exceed the permissible value;

3) a neighboring subscriber recognition unit for controlling the readout administration unit and the update unit to assign a same readout right and a same readout position to the detected subscribers in accordance with the control of the neighboring subscriber uniting unit;

4) a duplication unit for duplicating a same number of image data sections to be read from the storage media as a number of the different subscribers; and 5) a transmission control unit for controlling the transmission unit to transmit the duplicated image data sections to each of the different subscriber.

A fourth object of the present invention is to provide an image data readout time adjuster to be used for a video-on-demand system which can address various transmission requests from subscribers.

The fourth object can be achieved by combining the above-described units.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows image data sections: a1–e1 stored in the same readout sector of the disk 1, and the image data sections: a2–e2 stored in the same sector of the disk 2.

FIG. 3 shows image data sections a1–e1 stored in individual readout sectors of the disk 1 and a2–e2 stored in individual readout sectors of the disk 2.

FIG. 8 shows a table indicating storing positions in disks where the still picture data of each movie are stored and the reference numbers of disks and the storing positions in the disks where each initial data section of movies is stored. The table is used for addressing a transmission request from a subscriber in the first embodiment.

FIG. 10 shows a slot table for administrating the assignment of subscribers to the time slots in the first embodiment.

FIG. 16 shows the transition of the slot assignment when there is no free slot in a disk which stores the image data section corresponding to the start position of the movie A.

FIG. 23 shows the image data table for the movie A in the video-on-demand system provided with the readout adjuster of the second embodiment.

FIG. 24 shows the assignment modification when insertion. of a commercial message is allowed for the subscriber U40.

FIG. 37 shows the slot table which administrates subscribers whose readout rights and readout positions are coincided, and the overlap subscriber table.

DESCRIPTION OF THE PREFERRED EMBODIMENTS

<Embodiment 1>

Figure 7:
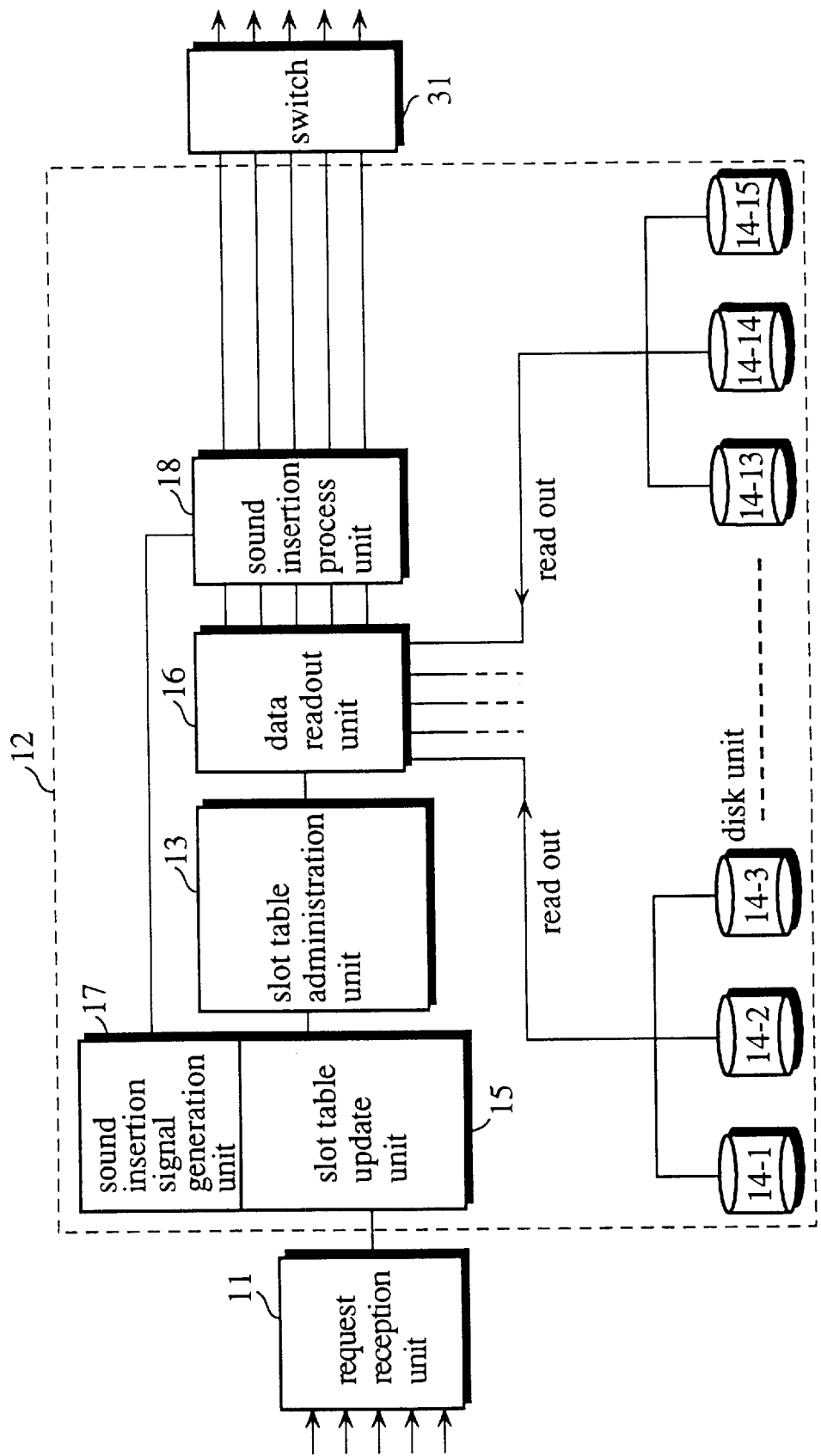
FIG. 7 shows the construction of a video-on-demand system provided with the readout adjuster 12 of the first embodiment of the present invention.

FIG. 7 shows the construction of a video-on-demand system provided with the readout adjuster of the present embodiment of the present invention.

The video-on-demand system is composed of a request reception unit 11, a main body 12 provided with the readout adjuster, and a switch 31.

The readout adjuster includes a slot table administration unit 13, a disk unit 14 composed of 15 disks (14-1) through (14-15), a slot table update unit 15, a data readout unit 16, a sound insertion signal generation unit 17, and a sound insertion process unit 18.

The readout adjuster further includes a special transmission request control unit which controls forwarding, rewinding, and other operations requested by subscribers; a temporary storage composed of FIFO which temporarily stores image data read; a modem which controls the connection with communication lines and performs A/D conversion; a transmission control unit which controls the transmission of image data to subscribers; a calculator which integrally controls each unit and performs necessary calculations; and a clock signal generation unit. The explanation and illustration of these units are omitted because they are all well-known and not directly related to the subject of the present invention.

The following arts and rules are also not explained because they are well-known.

The art of encoding, decoding, compressing, extending, or reading image data or audio data which have been made analog or digital to be stored or transmitted to hard disks. The art of displaying still pictures, motion pictures, or audio data which have been read or transmitted on CRT. The communication rules determined by CCITT, or rules of image data compression such as MPEG or JPEG.

The request reception unit 11 receives requests for desired image data from subscribers and transfers the requested image data to the readout adjuster.

On receiving the image data, the readout adjuster assigns time slots to the subscriber and outputs the image data to the switch 31.

Figure 5:
FIG. 5 shows the contents of the slot table to be used for the administration of the readout rights and the readout positions.

The slot table administration unit 13 administrates the assignment of the time slots to the subscribers and data readout positions on the disk unit 14 in the form of a table as shown in FIG. 5.

Each of the disks (14-1) through (14-5) stores image data of five different movies A, B, C, D, and E, which is digitalized and divided into image data sections of 256 Kbytees which correspond to image data for 0.5 second long. Each of the disks (14-1) through (14-5) further stores still picture data including the titles of movies, movie companies, performers' names, directors' names, or the like.

The slot table update unit 15 updates the entire contents of the slot table every time a readout step is started.

Figure 9:
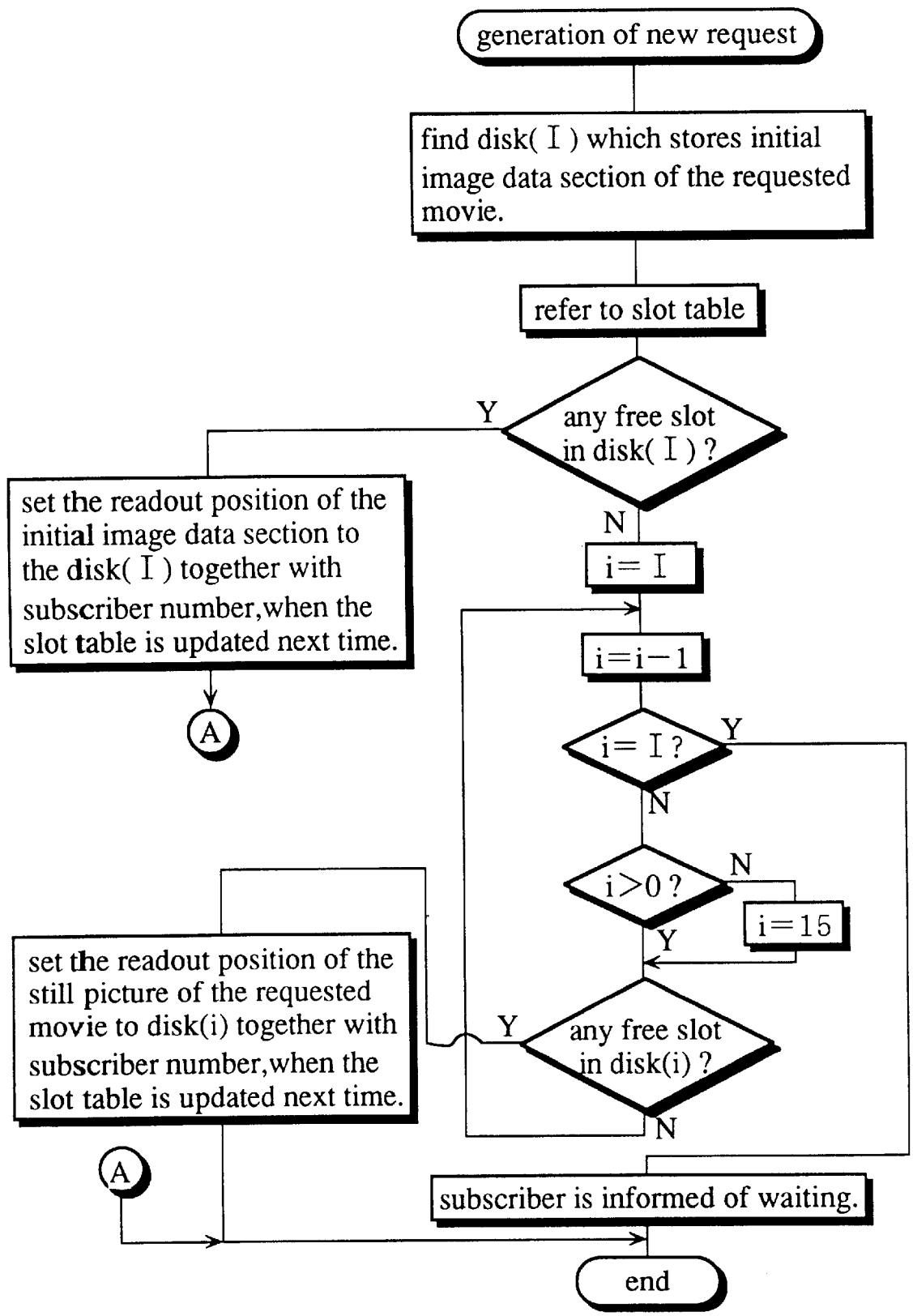
FIG. 9 shows a flowchart depicting the process for assigning the readout right to subscribers and determining readout positions.

In addition, on receiving a request for a movie from a subscriber, if there is a free slot in the disk which presently stores the image data section corresponding to the initial part of the movie, the slot table update unit 15 assigns the free slot to the subscriber. If there is no slot available, the unit 15 assigns a free slot belonging to another disk to the subscriber and updates the slot table to read the still picture data of the requested movie until the disk is ready for readout. In the case that no slot is available for the time being, it is informed to the subscriber. To make these procedure faster, the slot table update unit 15 holds a table which indicates storing positions in disks where the still picture data of each movie are stored and the reference numbers of disks and the storing positions in the disks where each initial data section of movies is stored. The table is used for addressing a transmission request from a subscriber in the first embodiment.as shown in FIG. 8. The flowchart of this process is shown in FIG. 9. The calculation time required for activating the slot table update unit 15 is much shorter than 0.5 second required for one readout step, so that it is ignorable. This can hold true for the other units both in the present embodiment and the following embodiments.

After the slot table is updated by the slot table update unit 15, the data readout unit 16 reads image data from each disk of the disk unit 14, based on the information on the slot table, and outputs image data with the terminal number of the subscriber.

The sound insertion signal generation unit 17 outputs to the sound insertion process unit 18 a sound insertion signal which indicates a monotonous and repeating sound relevant to the contents of each movie or unique to each movie company such as the sound of waves or roaring of a lion, when there is no free slot in the disk corresponding to a subscribers additional request.

The sound insertion process unit 18 synthesizes the sound data received from the sound insertion signal generation unit 17 with still picture data so that the sound data functions as background music, and outputs them to the switch 31.

The switch 31 distributes each image data section to a corresponding subscriber, based on the terminal number appended to the image data section.

The transition of the contents of the slot table is explained as follows.

FIG. 10 shows the slot table administrated by the slot table administration unit 13, which is basically the same as the conventional one shown in FIG. 5. Each disk has four slots which are numbered 1–4 respectively. Subscribers are always assigned smaller slots available.

Figure 1:
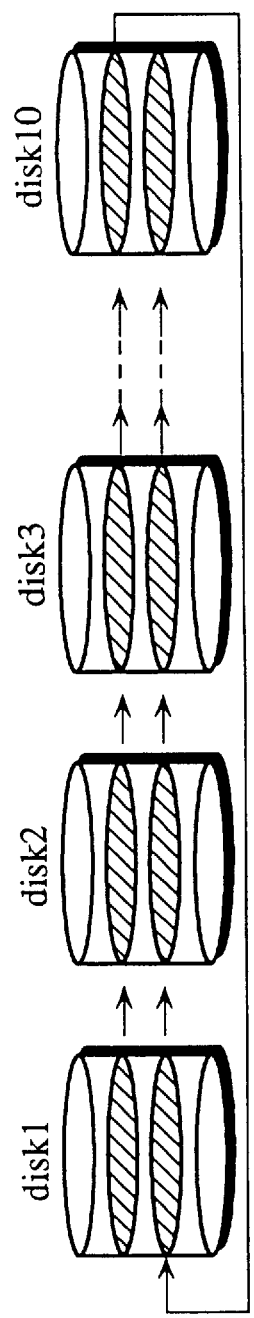
FIG. 1 shows a series of disks 1–10 which store image data for different movies.
Figure 4:
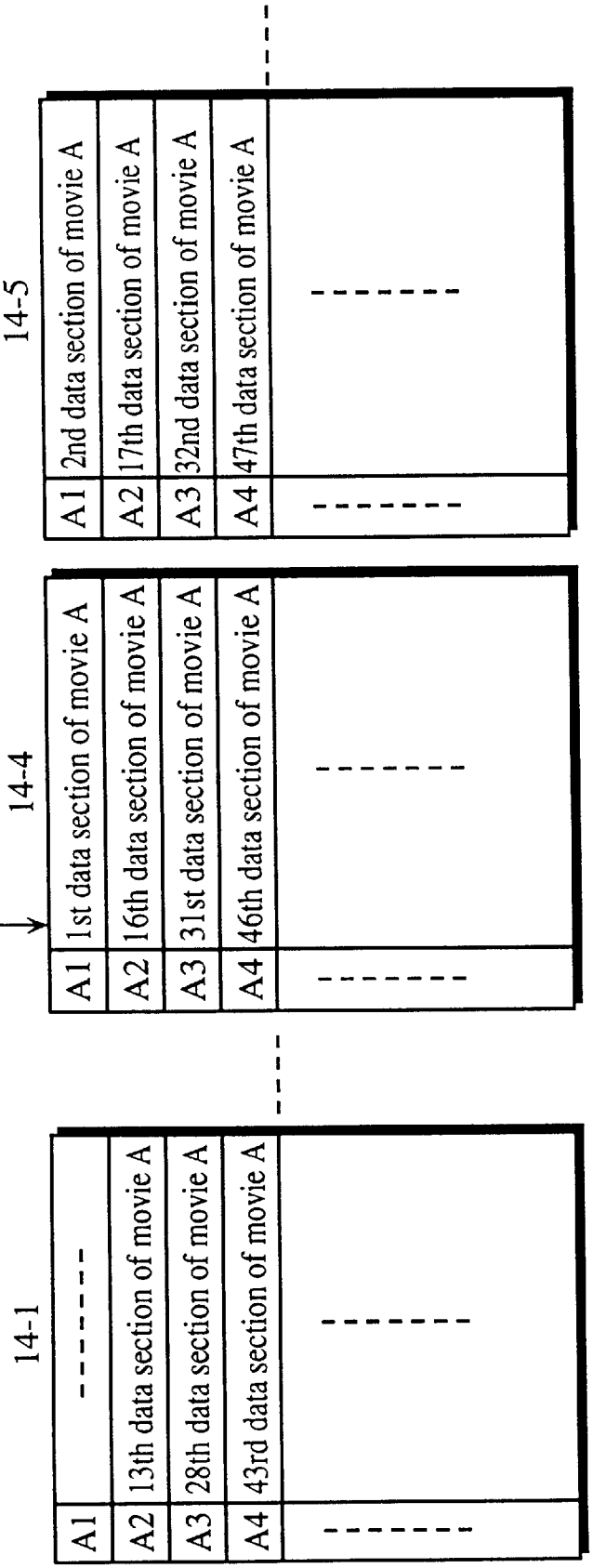
FIG. 4 shows the location of each image data section of movie A stored in the disks (14-1) through (14-15).

Each of the disks (14-1) through (14-15) stores image data sections of the movie A as shown in FIG. 4, and the image data sections are read starting at the position indicated by Al in the disk (14-4) which is followed by (14-5). The image data sections for the movies B–E are stored in the same manner as the movie A.

Figure 6:
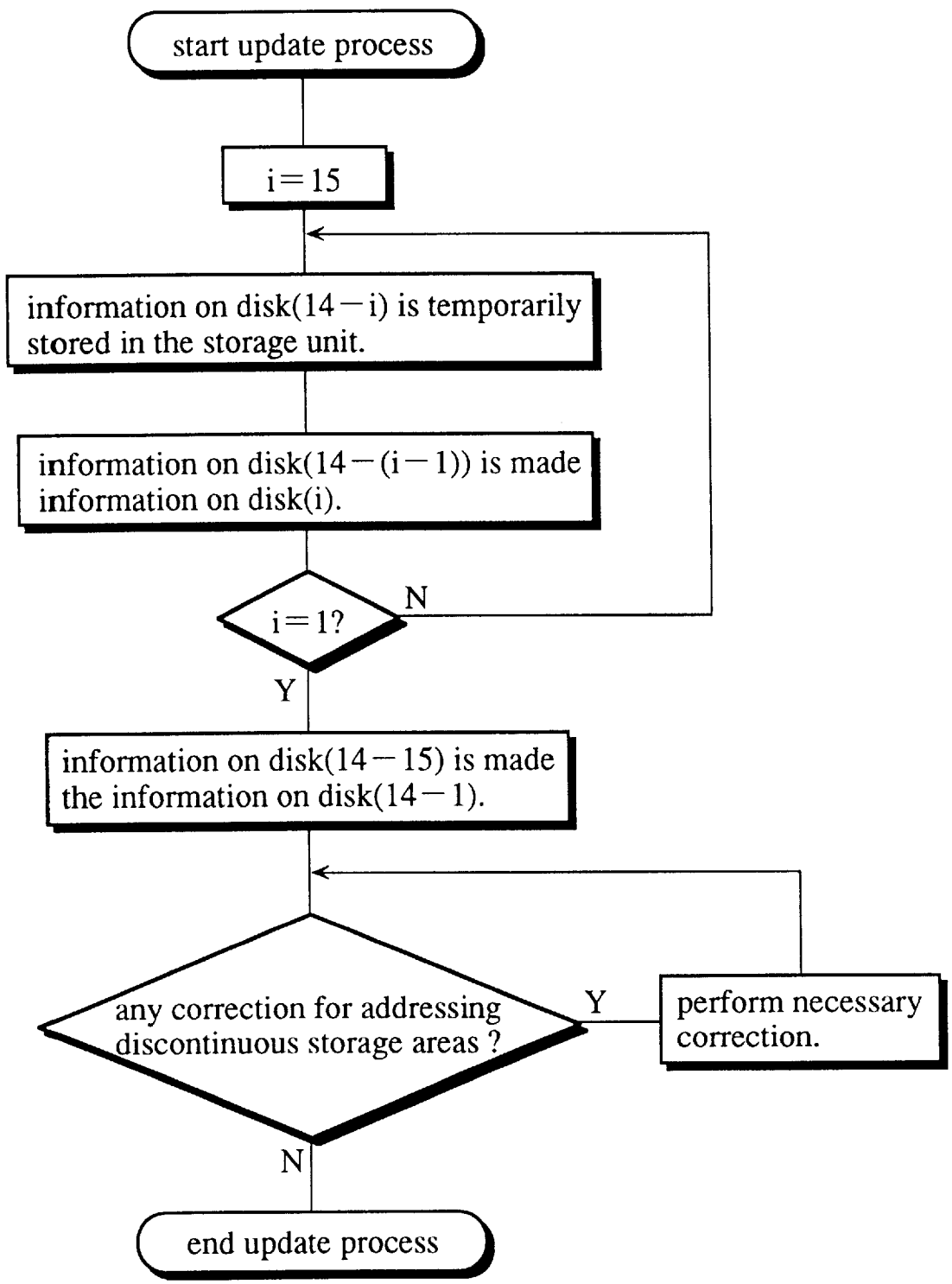
FIG. 6 shows a flowchart depicting the time table updating process.

Normally, a slot table is updated in the manner that each subscriber is assigned to a slot belonging to the disk which stores the subsequent image data section. Then, the data readout unit 16 reads an image data section from each disk, based on the updated information on the slot table in the same manner as the conventional ones shown in FIGS. 5 and 6.

Figure 11A:
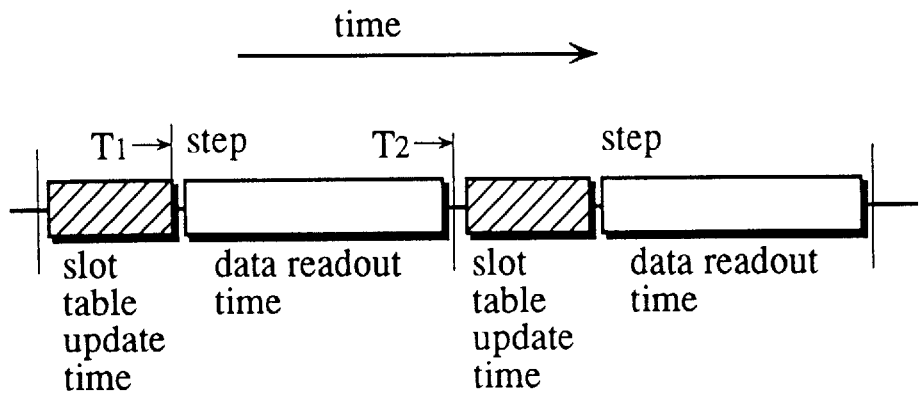
FIG. 11A shows the relationship between the time required for updating the slot table and the time required for reading image data.

FIG. 11A shows the relationship between the time required for updating the slot table by the slot table update unit 15 and the time required for reading an image data section by the data readout unit 16.

Figure 11B:
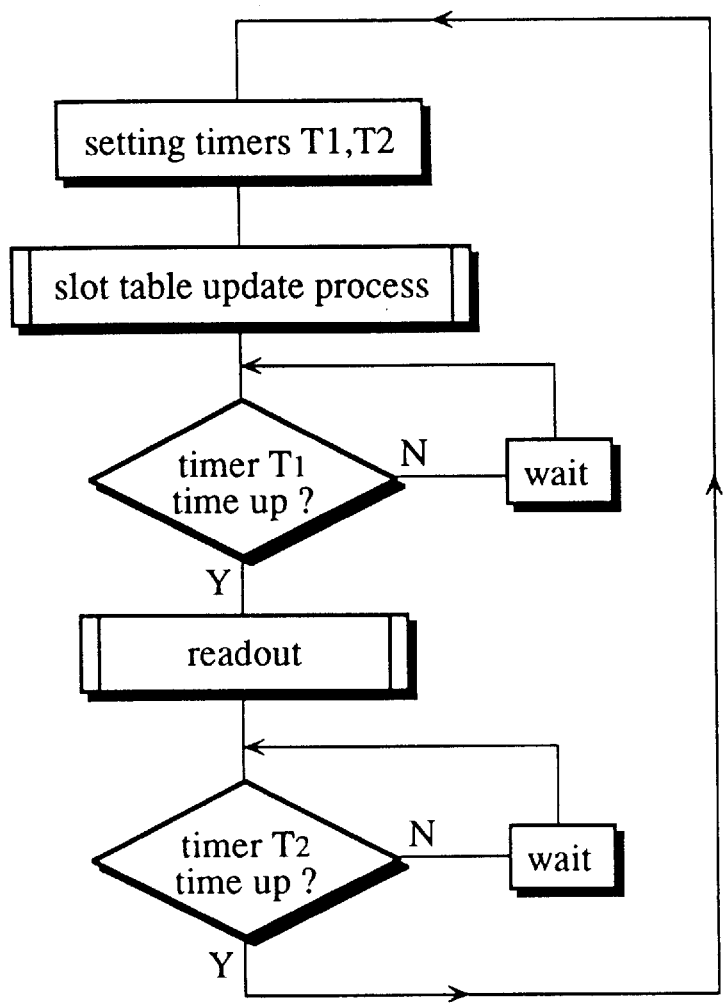
FIG. 11B shows the process of updating the slot table and reading the image data.

FIG. 11B shows the process of updating the slot table and reading image data sections. The image data sections can be read at most 4 times from each slot per data readout time.

Figure 12:
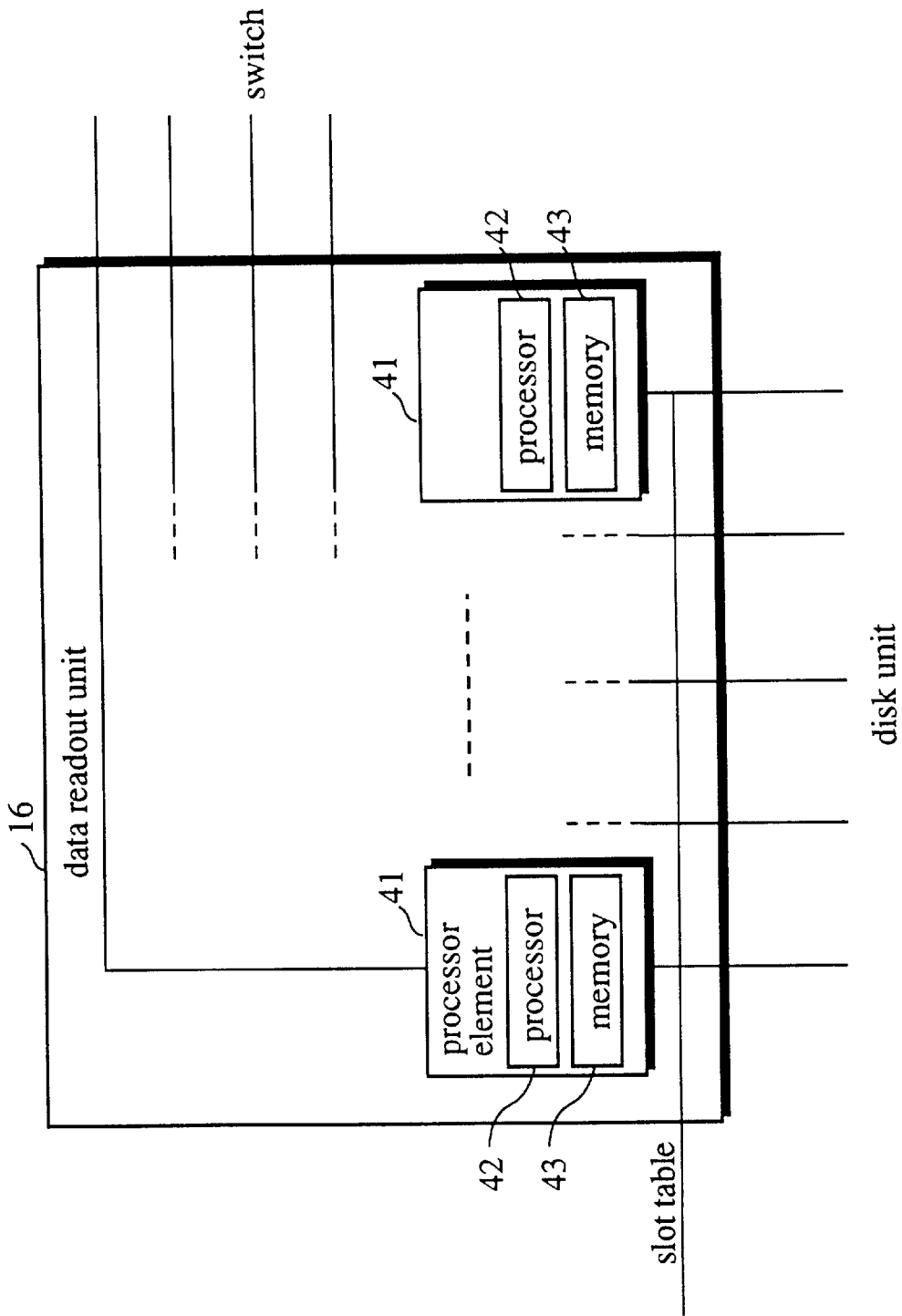
FIG. 12 shows the construction of the data readout unit.

FIG. 12 shows the construction of the data readout unit 16, which is composed of a plurality of processor elements 41 each having a processor 42 for reading data and a memory 43 for temporary storing data. An image data section read from the disks by the processor 42 is temporary stored in the memory 43 and transmitted as a packet including the terminal number of the subscriber.

The following is a description on the process for adding a new subscriber.

Suppose that a subscriber U01 makes a request for movie A, the request reception unit 11 receives the request, which includes the terminal number to identify the subscriber U01 and the title of the movie A. The contents of the request are stored in a control unit, which is not described because it is well-known.

The request reception unit 11 informs the request to the slot table update unit 15.

Figure 13:
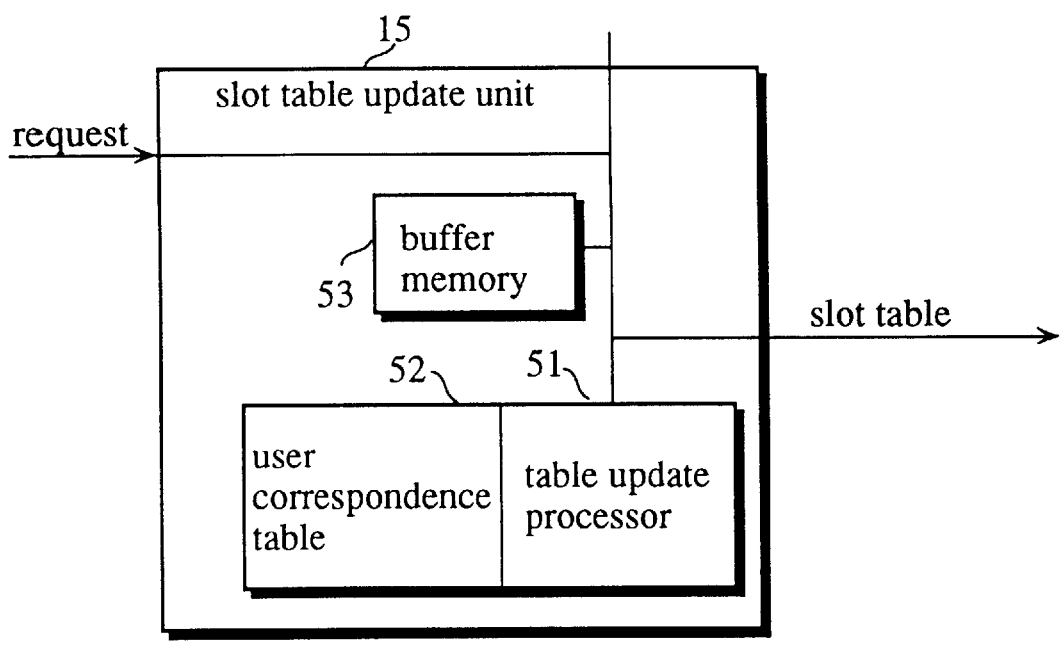
FIG. 13 shows the construction of the slot table update unit.

As shown in FIG. 13, the slot table update unit 15, which is composed of a table update processor 51, a user correspondence table 52, and a buffer memory 53, temporally stores the received request until the next readout step starts, updates all the contents of the table during the next slot table update time, and adds the subscriber U01 to the table.

Figure 14:
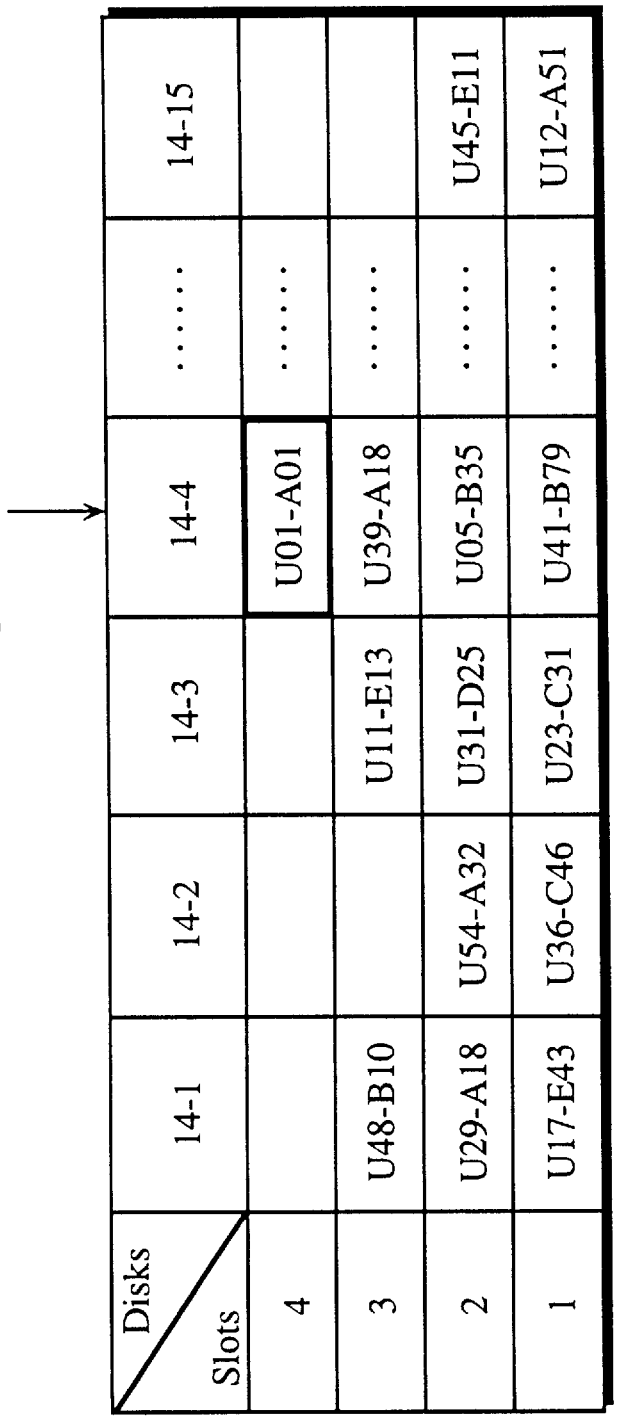
FIG. 14 shows the assignment of time slots to the subscriber U01 when there is a free slot in a disk which stores the image data section corresponding to the start position of the movie A.

FIG. 14 shows the assignment of time slots to the subscriber U01 when there is a free slot in the disk (14-4) which stores the image data section corresponding to the start position of the movie A. The subscriber U01 is assigned the slot 4 indicated in a bold square to read the image data section (A01) corresponding to the start position of the movie A. Then, the data readout unit 16 reads the image data section, based on the updated slot table and transmitted to the subscriber U01.

Figure 15:
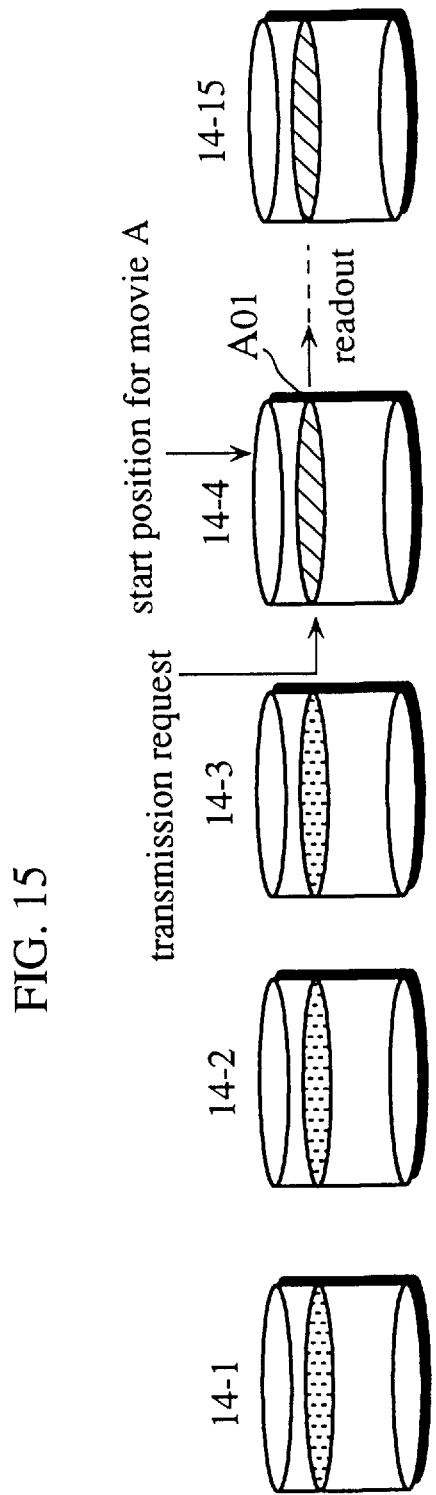
FIG. 15 shows an image data readout operation from the disks (14-4) and (14-5) when there is a free slot in a disk which stores the image data section corresponding to the start position of the movie A.

FIG. 15 shows an image data section readout operation from the disks (14-4) and (14-5).

FIG. 16 shows the transition of the slot assignment when there is no free slot in the disk (14-4) which stores the start position of the movie A. In this case, the disk (14-2) which has an image data section closest to the start position of movie A is selected from disks having free slots. Then, the smallest-numbered free slot (slot 3) is assigned to subscriber 1 and still picture data (TI) of movie A is added to the top slot table in FIG. 16. Then, the data readout unit 16 reads data based on the updated slot table to send the still picture data to the subscriber 1. All the disks store the same still picture data (T1), which are read from the disks until the disk (14-4) which has the image data section corresponding to the start position of the movie A is assigned to the subscriber 1 as shown in the middle table of FIG. 16. The slot table is updated so that the initial image data section (AO1) of the movie A is read, as shown in the bottom table of FIG. 16.

Figure 17:
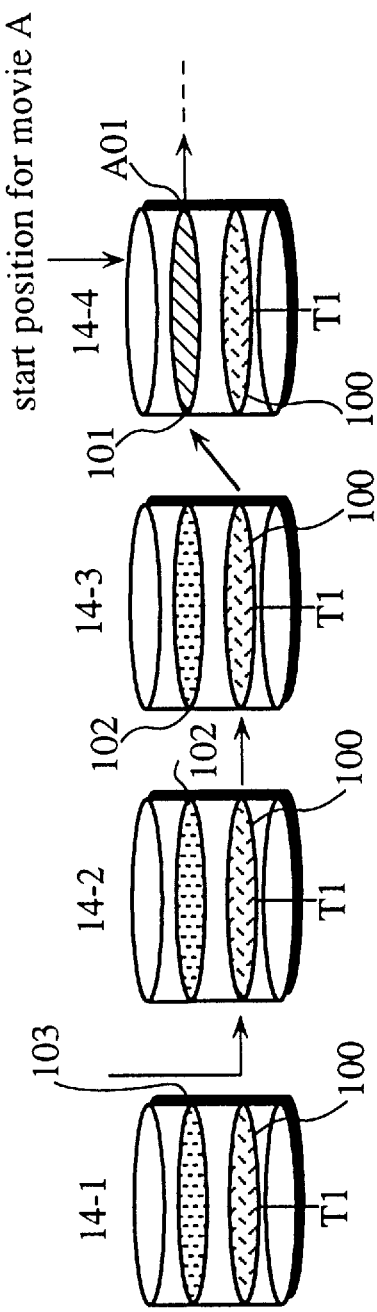
FIG. 17 shows the image data readout operation when there is no free slot in a disk which stores the image data section corresponding to the start position of the movie A.

The image data reading operation of the disks (14-1) through (14-15) is shown in FIG. 17. In FIG. 17, the area 100 stores the still picture of the movie A and the area 101 stores the initial image data section (A01).

While the still picture data (T1) are being read for the subscriber 1 because the disk (14-4) has no free slot, the sound insertion signal generation unit 17 transmits a sound insertion signal to the sound insertion process unit 18 during each data readout time. The sound insertion signal includes a terminal number as the identification number of the subscriber 1.

The sound insertion process unit 18, which is capable of appending music data to the still picture data, selects the still picture data to be sent to the subscriber 1 from among the image data to be read in accordance with the terminal number of the subscriber 1, and sends out the still picture data by appending the music data to the switch 31. As a result, the subscriber 1 receives the still picture data and the sound data.

Figure 18:
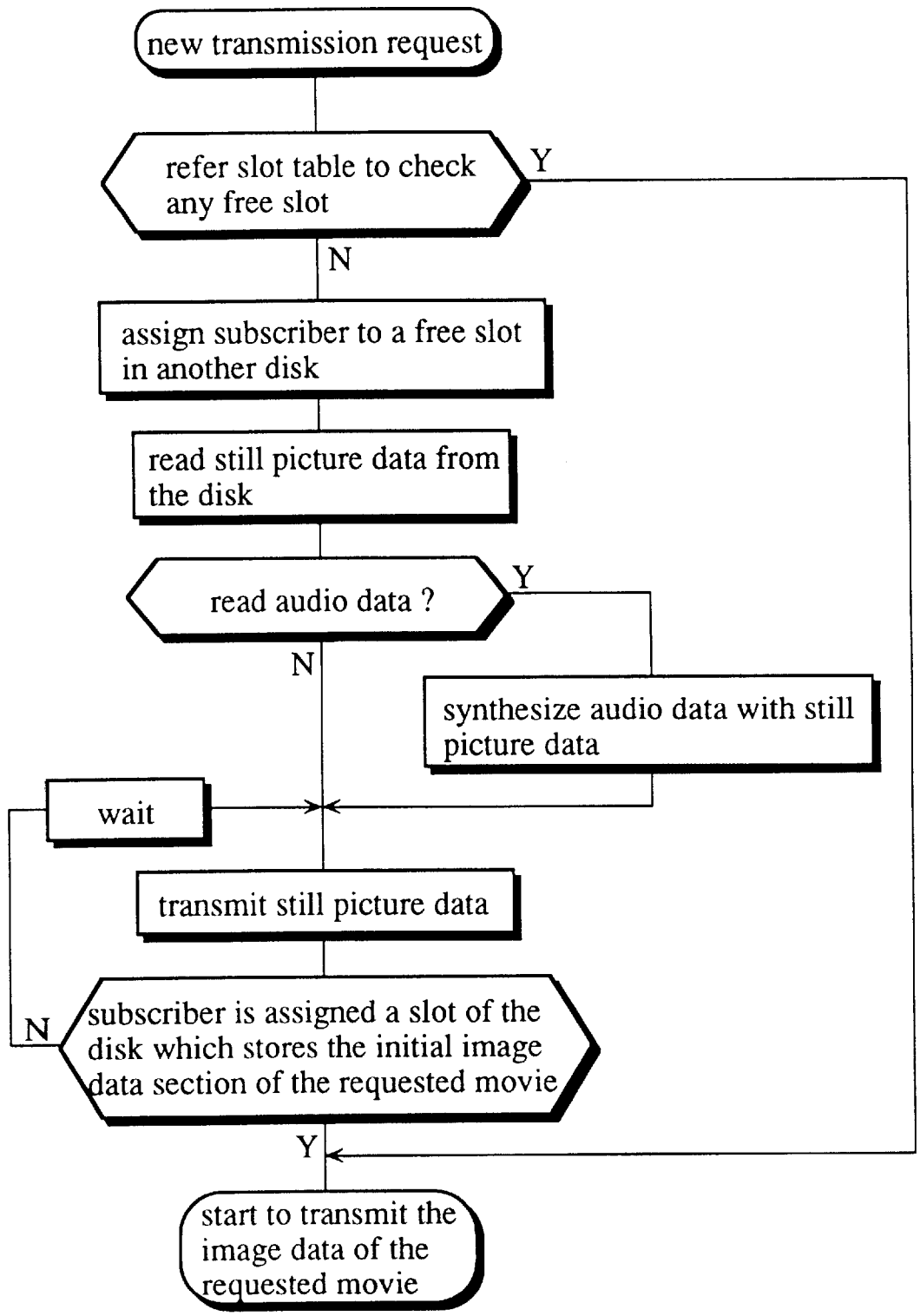
FIG. 18 shows the overall flow of the operations in the first embodiment.

The switch 31 receives the sound data-appended still picture data together with other image data and distributes to subscribers according to the terminal numbers. These operations are shown in the flowchart of FIG. 18.

When the slot table update unit 15 receives requests from a number of subscribers in one readout time through the request reception unit 11, the requests are stored in the buffer memory and processed in the slot table update time in the next step.

Although the still picture data are sent with music data by providing the sound insertion signal generation unit and the sound insertion process unit in the present embodiment, the still picture data only may be distributed without providing these units.

Figure 19:
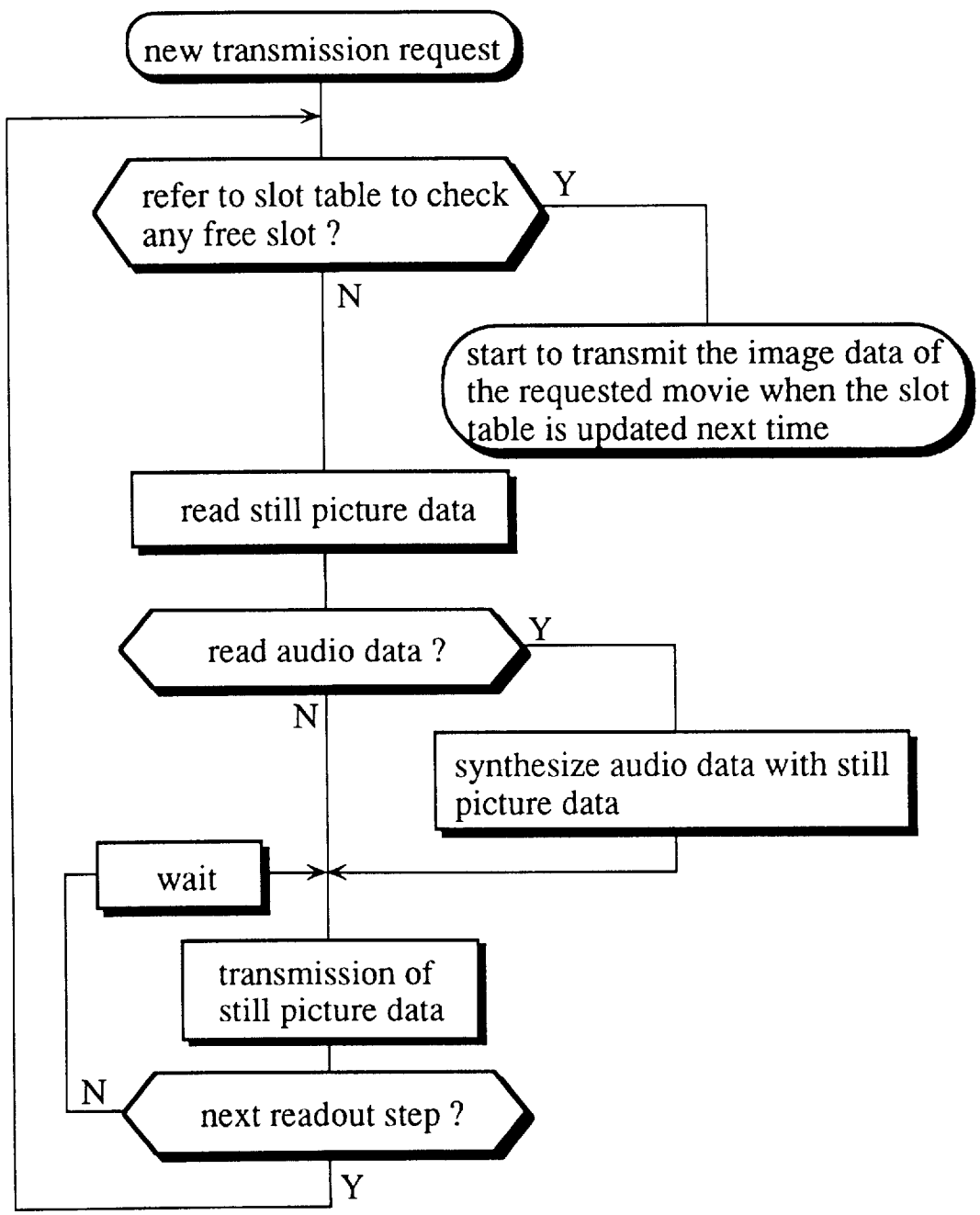
FIG. 19 shows the overall flow of a modified example of the first embodiment.

As an example of the systematic modification of the present embodiment, a separate storage may be provided exclusively for still picture data while the readout right and the waiting order are controlled apart from the still picture data. This is convenient in a case where there are many subscribers waiting. The transmission of still picture data in this case is shown in the flowchart of FIG. 19.

Figure 20:
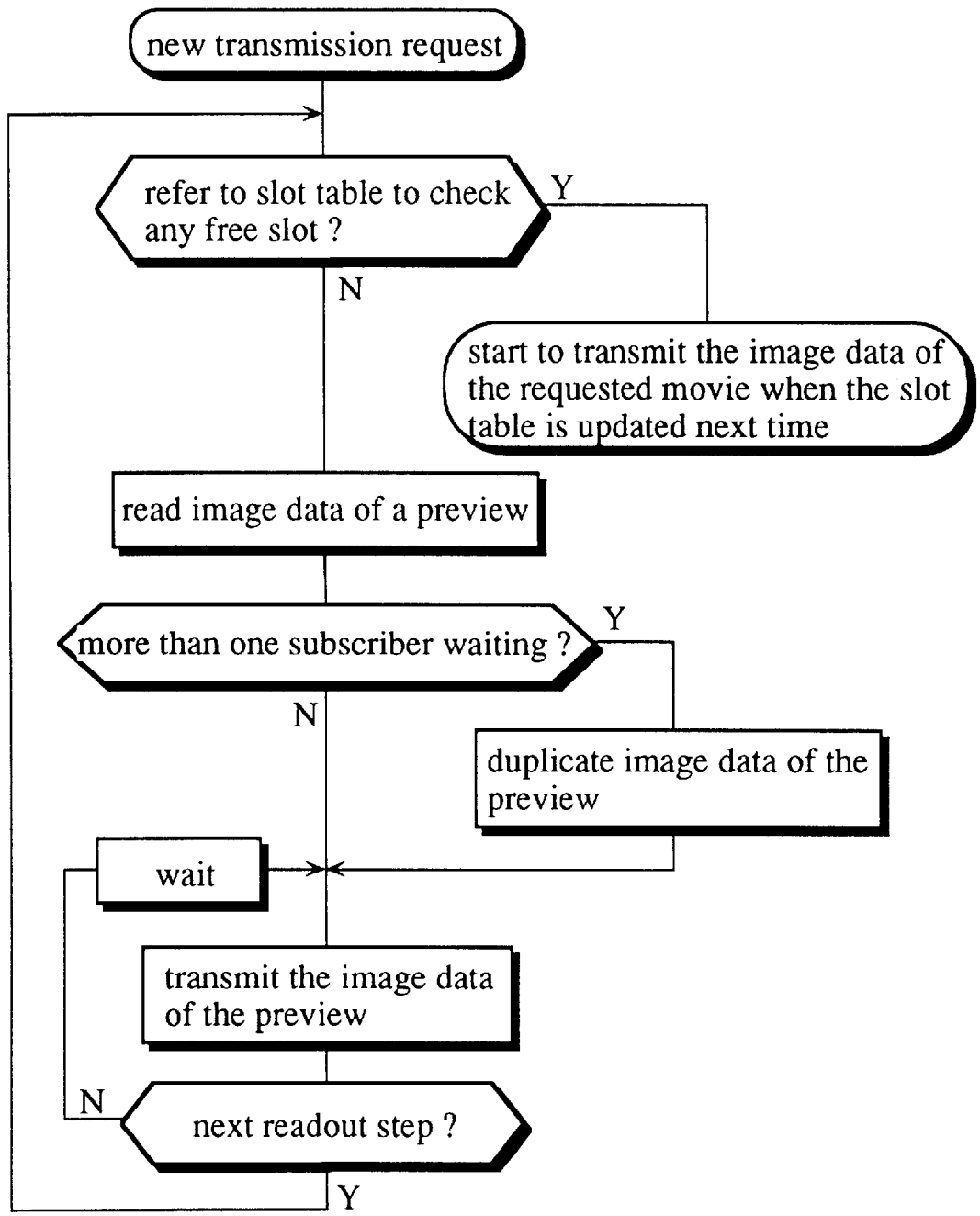
FIG. 20 shows the overall flow of another modified example of the first embodiment.

As another example of the systematic modification of the present embodiment, a separate disk may be provided for subscribers who are waiting for the readout right and the readout position with the preview of a forthcoming movie instead of the still picture. In the case where there are many subscribers waiting, the preview may be duplicated to be supplied at a same time in the procedure shown in the flowchart of FIG. 20.

The still picture may be words such as "Please wait until the readout right is available."

The still picture may also a commercial message.

The same still picture may be provided to all the movies, or varied depending to the productions of the movies.

The information on other available movies may be also displayed.

These image data may be analog data instead of digital data.

Both the image data and audio data may be analog data and digital data combined. Furthermore, only sound data may be stored as analog data to provide sound of high quality.

Instead of associating each subscriber's identification number with each area in which an image data sections to be sent to the subscriber is stored, the slot table may be formed by associating each subscriber's identification number with a serial number which indicates 256 bytes image data sections.

In this case, another table is formed which associates a serial number assigned to each image data section of each movie with a corresponding area in a disk in which the serial number is stored. The serial number increments one by one as the readout step proceeds.

<Embodiment 2>

Figure 21:
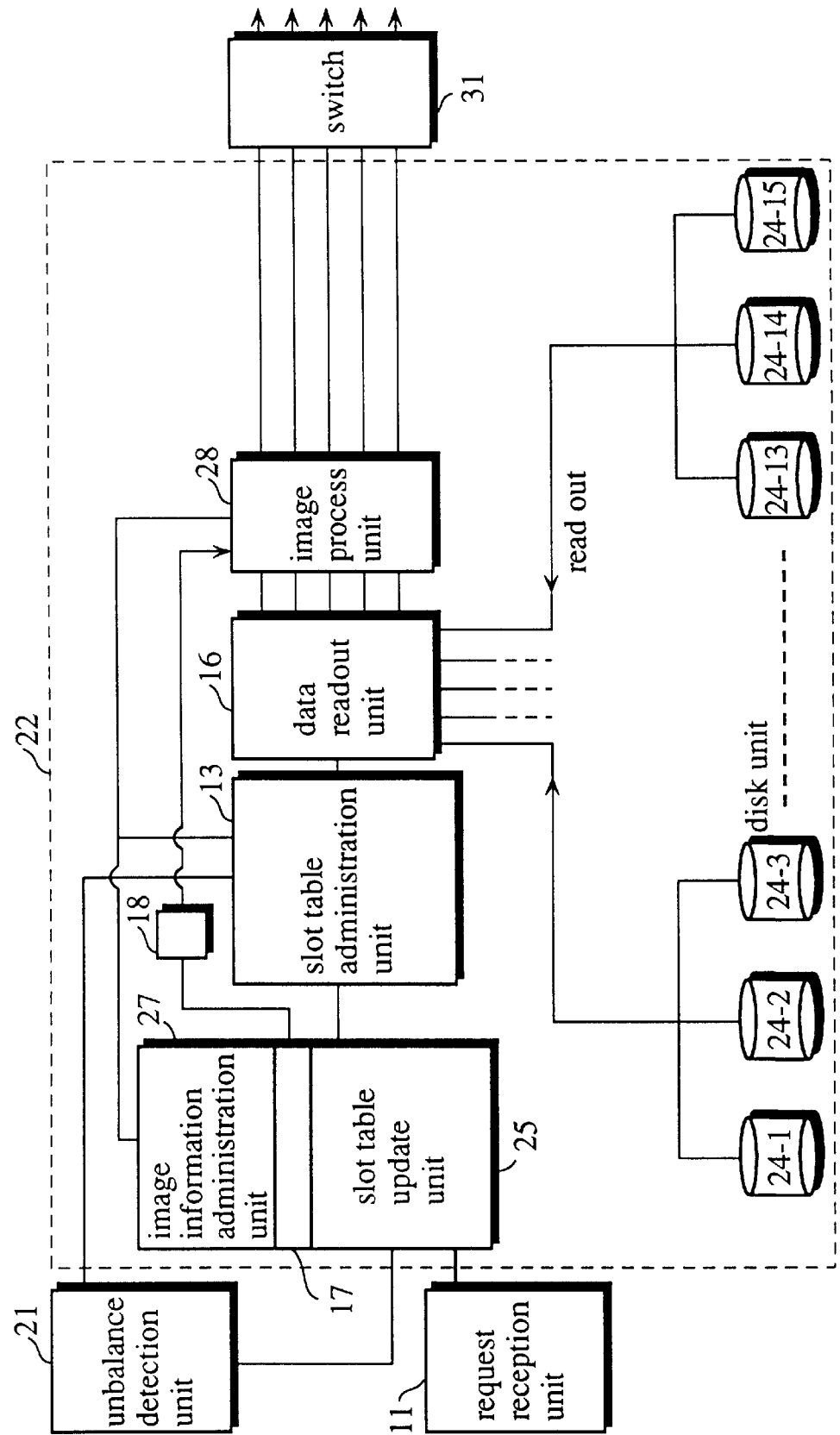
FIG. 21 shows the construction of the video-on-demand system provided with the readout adjuster of the second embodiment of the present invention.

FIG. 21 shows the construction of the video-on-demand system provided with the image data readout time adjuster of the present embodiment of the present invention.

The system is basically the same as that of the first embodiment shown in FIG. 7 except that an unbalance detection unit 21 is attached to the readout adjuster 22, and the readout adjuster 22 is provided with an image information administration unit 27 and an image process unit 28. Consequently, the slot table administration unit 13 and the slot table update unit 25 have different functions from those of the first embodiment.

The delay and acceleration of readout operations in the present embodiment are processed differently from the first embodiment; however, the disk unit has the same number of slots, slot table, and the same method of storing image data sections as in the first embodiment shown in FIGS. 4 and 10.

Furthermore, the present embodiment has the following aspects which are common to the first embodiment: subscribers are assigned slots of smaller numbers available in each disk of the disk unit 24, and the slot table is updated in the manner that subscribers are assigned subsequent slots. The relationship between the slot table update time and the data readout time, the construction of the data readout unit 16 and the slot table update unit 25, and the operation of the data readout unit 16 are all the same as those in the first embodiment. Consequently, FIGS. 11–13 of the first embodiment are referred to in the following explanation.

On detecting unbalance in the assignment of time slots to subscribers by referring to the slot table, the unbalance detection unit 21 reads an assignment modifying request and transmits the request to the readout adjuster 22.

The present embodiment tries to avoid the case where all the four slots are assigned as much as possible, which is regarded as the presence of unbalance, thereby addressing the forwarding and rewinding requests from subscribers.

The readout adjuster 22 receives modification requests from the unbalance detection unit 21, performs the requested modification, and transmits image data sections to the switch 31.

The slot table administration unit 13 administrates information on the assignment of time slots to the subscribers and on the readout positions in the form of tables, in the same manner as the first embodiment.

Each disk (24-1) through (24-15) of the disk unit 24 stores image data of five different movies A, B, C, D, and E, which are digitalized and divided into image data sections of 256 Kbytes which correspond to image data for 0.5 second long in the same manner as the first embodiment. However, the present embodiment is different from the first embodiment in that the present embodiment stores the still picture data, fade-in and fade-out data to every disk.

Figure 22:
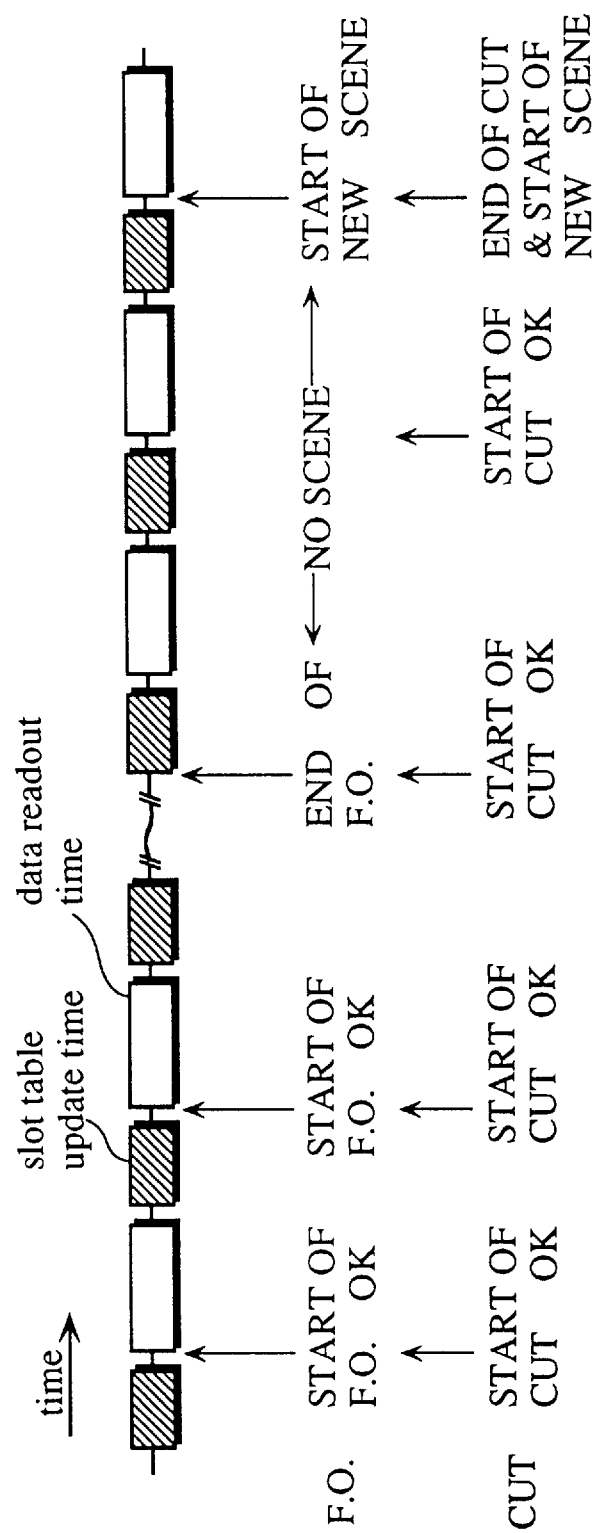
FIG. 22 shows the relationship between the starting and ending positions of the image effects and the slot data update time and the data readout time.

The time to read subsequent image data sections is moved forward as image data are edited by omitting some sections, and is moved backward by a repetition of the same image data section or insertion of a commercial message. The time is also moved backward by fade-in or fade-out operation which include a certain time period to display scenes with no image data. The time period is determined based on the sum of the slot table update time and the data readout time shown in FIG. 11 and the next scene is supposed to be a new scene on account of image compression. In this embodiment, the time period has its maximum value and when the time period is below the maximum value, an appropriate value is supposed to be determined according to the number of free slots. This holds true in the case of the length of image data sections, the number of repetitions of the same image data section, and the time length of commercial messages to be inserted. FIG. 22 shows the case of fade-out and cutting is applied to image data.

The image information administration unit 27 holds an information table, which includes positions which allow commercial messages to be inserted, some image data sections to be cut, the same image data section to be re-sent, and image data to be faded-in and faded-out for each movie. Generally, these positions correspond to a turn of scenes, and motionless or soundless scenes of the movie. For example, a commercial message can be inserted in a scene where a new person appears in a new place, a scene where a beautiful scenery appears can be repeated, and a scene where a villain is running wild can be cut. Since most movies include such scenes, these techniques can be used to execute delaying or forwarding the time to transmit image data, without making subscribers uncomfortable.

The slot table update unit 25 updates the entire contents of the slot table every time a readout step is started. If there is a request of modifying the slot assignment to subscribers, the slot table update unit 25 receives it and adjusts time by either inserting a commercial message, cutting some image data sections, repeating the same image data section, fading-in, or fading-out, thereby modifying the slot assignment to subscribers.

If the image information administration unit 27 allows the insertion of a commercial message at the cost of reducing a service fee, a subscriber is assigned a free slot in another disk, and the slot table is updated in each step to read still picture data of the commercial message until the subscriber is assigned the slot belonging to the disk which stores the image data section corresponding to the next scene.

If the image information administration unit 27 allows some scenes of the movie to be cut, the slot table is updated to read data by skipping the cut scenes.

If the image information administration unit 27 allows a scene of a beautiful scenery to be repeated, the slot table is updated to read the corresponding image data section repeatedly.

If the image information administration unit 27 allows fade-in of a scene, the slot table is updated to read and transmit the image data section corresponding to the scene.

If the image information administration unit 27 allows fade-out of a scene, the slot table is updated to read and transmit the image data section corresponding to the scene.

In the present embodiment, repeat, commercial message insertion, cut, fade-in, and fade-out have higher priorities in this order in terms of process simplicity and favorableness of subscribers. If none of these techniques is allowed, the slot table is updated in the normal manner to read the next image data section determined by the story of the movie.

The data readout unit 16 reads image data sections from the disks (24-1) to (24-15) based on the information held in the slot table which is updated at every readout step by the slot table update unit 25.

The image process unit 28 applies necessary process to data read by the image data readout unit 16, based on the table held by the image information administration unit 27. Then, the subscriber address is appended to the image data section and sent out.

The switch 31 distributes the image data sections to subscribers by selecting a destination through the subscriber address.

The following is a description on the information on the positions where cutting of image data sections or repeating the same image data section is allowed, which is shown in the table for each movie.

FIG. 23 shows the table. In the table, 10-D05 shown in the top left box indicates that the insertion of a commercial message is allowed before the image data section stored in the position identified as A10 in the disk (14-5). Similar tables are provided for the other movies B–E.

The following is a description of the flow of modifying the slot assignment to the subscribers.

The unbalance detection unit 21 monitors the time slots to see if the time slots of a specific disk is assigned to a large number of subscribers, based on the slot table for each disk. If there is such a disk, the subscribers assigned to the slot 1 of the disk are designated and a request for modifying the slot assignment is sent to the slot table update unit 25.

Suppose that the slots of the disk (24-3) are assigned to a large number of subscribers and an assignment modification request is transmitted to the subscriber U40 who is assigned to the slot 1 of the disk (24-3) by the unbalance detection unit 21.

On receiving the assignment modification request, the slot table update unit 25 temporarily stores the request until the next readout step, updates the entire assignment in the next slot table update time, and modifies the slot assignment of the subscriber U40 by means of a selected time adjusting technique.

In any of the readout time adjusting techniques, the subscriber U40 is assigned the smallest-numbered slot among those available in the disk. Furthermore, the subscribers assigned to the slot 2 and the slot 3 are assigned one-smaller-numbered slots, namely, the slot 1 and the slot 2, respectively.

If the insertion of a commercial message is selected as a method of modifying the slot assignment, the slot table update unit 25 examines whether the insertion is allowed for the subscriber U40, based on the table held by the image information administration unit 27. FIG. 24 shows the assignment modification when the insertion is allowed for the subscriber U40. If there is no free slot in the disk (24-2), then the disk (24-3) will have no free slot in the next readout step as shown in the top table in FIG. 24. Consequently, the disk (24-1) which is closest to the disk (24-3) in time is selected among disks having most slots available within the readout step of the disk (24-2). The free slot 2 is assigned to the subscriber 40 when the slot table is updated next, and the slot table is updated to read the still picture of the commercial message, as shown in the middle table in FIG. 24. Then, the slot table is updated at every readout step to read the still picture until the subscriber U40 is assigned a slot of the disk (24-3). When the subscriber U40 is assigned the slot of the disk (24-3), the image data section B79 of the movie B is read as shown in the bottom table in FIG. 24.

Figures 25, 26:
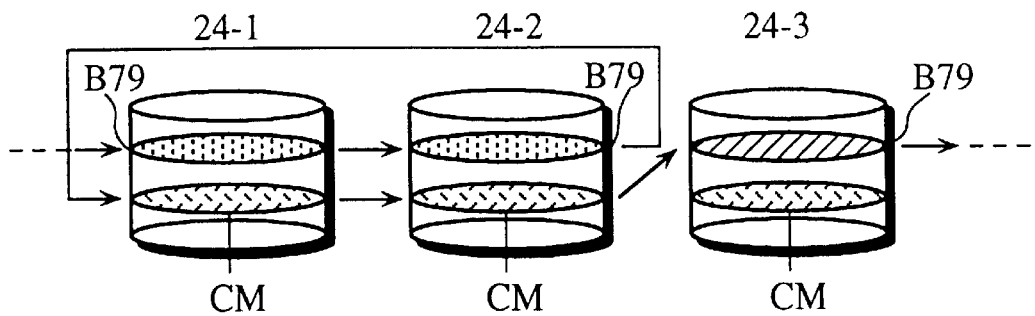
FIG. 25 shows the readout operation of the relevant disks when insertion of a commercial message is allowed.
FIG. 26 shows the assignment modification when the cutting of image data sections is allowed.

FIG. 25 shows the readout operation of the relevant disks at this moment. Having been informed that the insertion of a commercial message is not allowed because of the absence of a free slot, the slot assignment to the subscriber U40 is not modified and the next image data section (B79) of the movie B is read from the disk (24-3).

Figure 27:
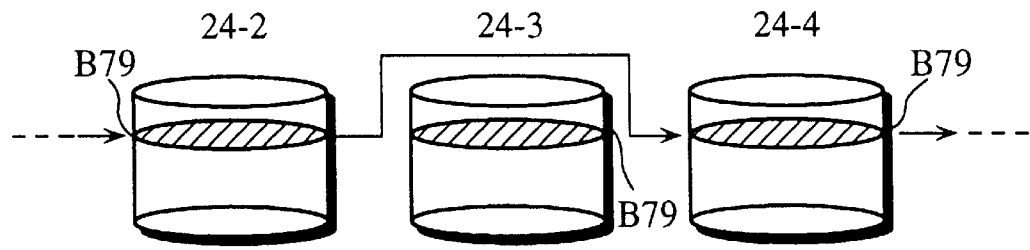
FIG. 27 shows the readout operation when the cutting of image data sections is allowed.

When cutting of an image data section is selected as a method of modifying the assignment, the slot table update unit 25 examines whether the cutting is allowed for the subscriber U40, based on the table held by the image information administration unit 27. FIG. 26 shows the slot assignment modification when the cutting of the image data section is allowed for the subscriber U40. In the case of the top table, the slot table is updated so that a readout operation from t:he disk (24-3) is skipped and the image data section (B79) of the movie B is read from the next disk (24-4) for the subscriber U40 as shown in the bottom table of FIG. 26. FIG. 27 shows the readout operation.

If the information sent from the image information administration unit 27 does not allow the cutting, no modification is applied to the slot assignment for the subscriber U40, reading out the next image data section (B79) of the movie B from the disk (24-3).

Figure 28:
FIG. 28 shows the assignment of time slots for subscribers when the repetition of a same image data section is allowed.
Figure 29:
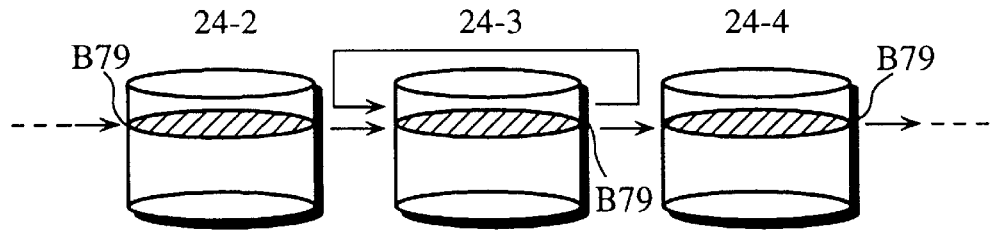
FIG. 29 shows the data readout from the disk when the repetition of a same image data section is allowed.

When repetition of an image data section is selected as a method of modifying the assignment, the slot table update unit 25 examines whether the repetition is allowed for the subscriber U40, based on the table held by the image information administration unit 27. The slot assignment for the subscriber U40 when the repetition is allowed is modified as shown in FIG. 28. The next image data section (B79) of the movie B is read from the disk (24-3) as shown in the top table. In the next readout time period, the slot table is updated to read the same image data section (B79) from the disk (24-3) as shown in the bottom table. The image data readout operation from the disk unit at this time is shown in FIG. 29. Although the image data section which can be repeatedly read is stored in one storage in FIG. 29, they may be stored in more than one storage medium. Since the digital image data are usually stored 0.5 second as a unit in a compressed form, this would be better for increasing the effects of the repetition.

If the information sent from the image information administration unit 27 does not allow the repetition, no modification is applied to the slot assignment for the subscriber U40, reading the next image data section of the movie B (B79) from the disk (24-4).

Figure 30:
FIG. 30 shows the assignment of time slots when the fade-in is allowed.
Figure 31:
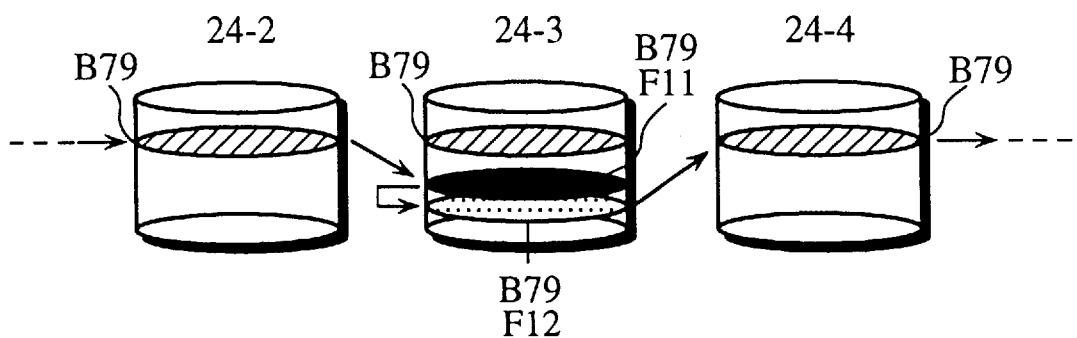
FIG. 31 shows the image data readout from the disk unit when the fade-in is allowed.

When fade-in is selected as a method of modifying the slot assignment, the slot table update unit 25 examines whether the fade-in is allowed for the subscriber U40, based on the table held by the image information administration unit 27. The slot assignment for the subscriber U40 when the fade-in is allowed is modified as shown in FIG. 30. Instead of reading the next image data section (B79) of the movie B from the disk (24-3), image data section (B79F11) containing no image is read from the fade-in image data sections stored in the disk (24-3) as shown in the top table of FIG. 30. In the next readout step, the slot table is updated to read fade-in data section (B79F12) from the disk (24-3) as shown in the bottom table of FIG. 29. The readout operation from the disk unit at this time is shown in FIG. 31.

If the information sent from the image information administration unit 27 does not allow the fade-in, no modification is applied to the slot assignment for the subscriber U40, reading the next image data section (B79) of the movie B from the disk (24-3).

Figure 32:
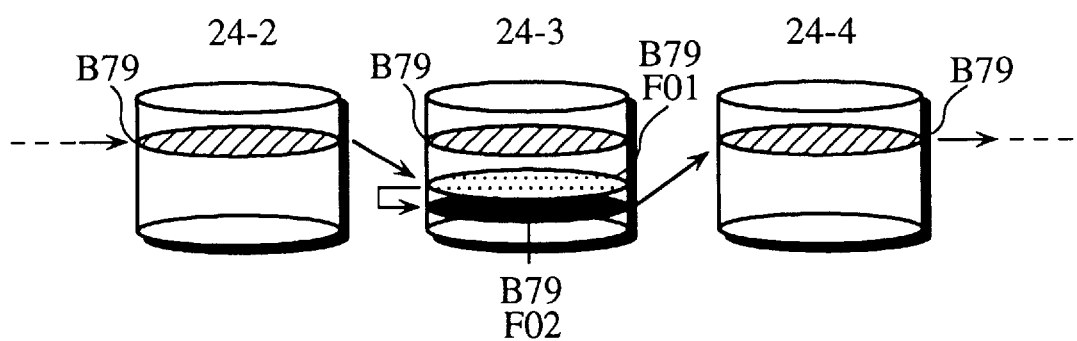
FIG. 32 shows the image data readout from the disk unit when the fade-out is allowed.

When fade-out is selected as a method of modifying the assignment, the slot table update unit 25 examines whether the fade-out is allowed for the subscriber U40, based on the table held by the image information administration unit 27. The slot assignment for the subscriber U40 when the fade-out is allowed is modified in the same manner as the fade-in. However, in the case of fade-out, the image data section (B79F01) corresponding to fading out image is first read from among the fade-out image data sections stored in the disk (24-3). Then, in the next readout step, the image data section (B79F02) containing no image is read from the same disk (24-3) as shown in FIG. 32.

If the information sent from the image information administration unit 27 does not allow the fade-out, no fade-out data section is read out, and the next image data section (B79) of the movie B is read from the disk (24-3).

Whichever method is used, when more than one request for slot assignment modification is sent from the unbalance detection unit 21 to the slot table update unit 25 in one readout step, the requests are stored in a buffer memory, and a selected method is applied to each of the requests in the next slot table update time.

Figure 33:
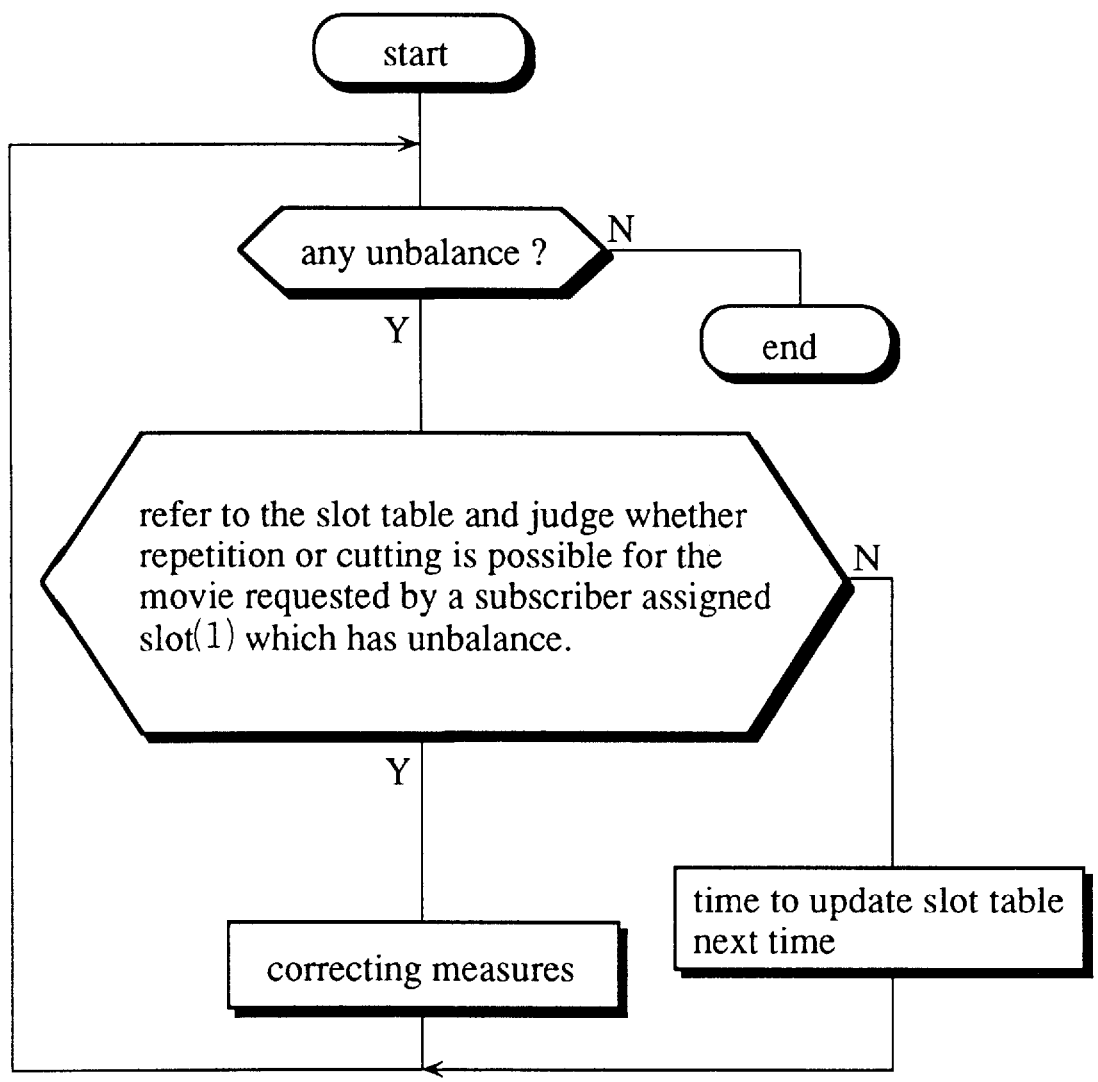
FIG. 33 shows a flowchart depicting the unbalance correction operation in the second embodiment.

FIG. 33 is a flowchart showing the unbalance correction operation according to the above procedures.

Figure 34:
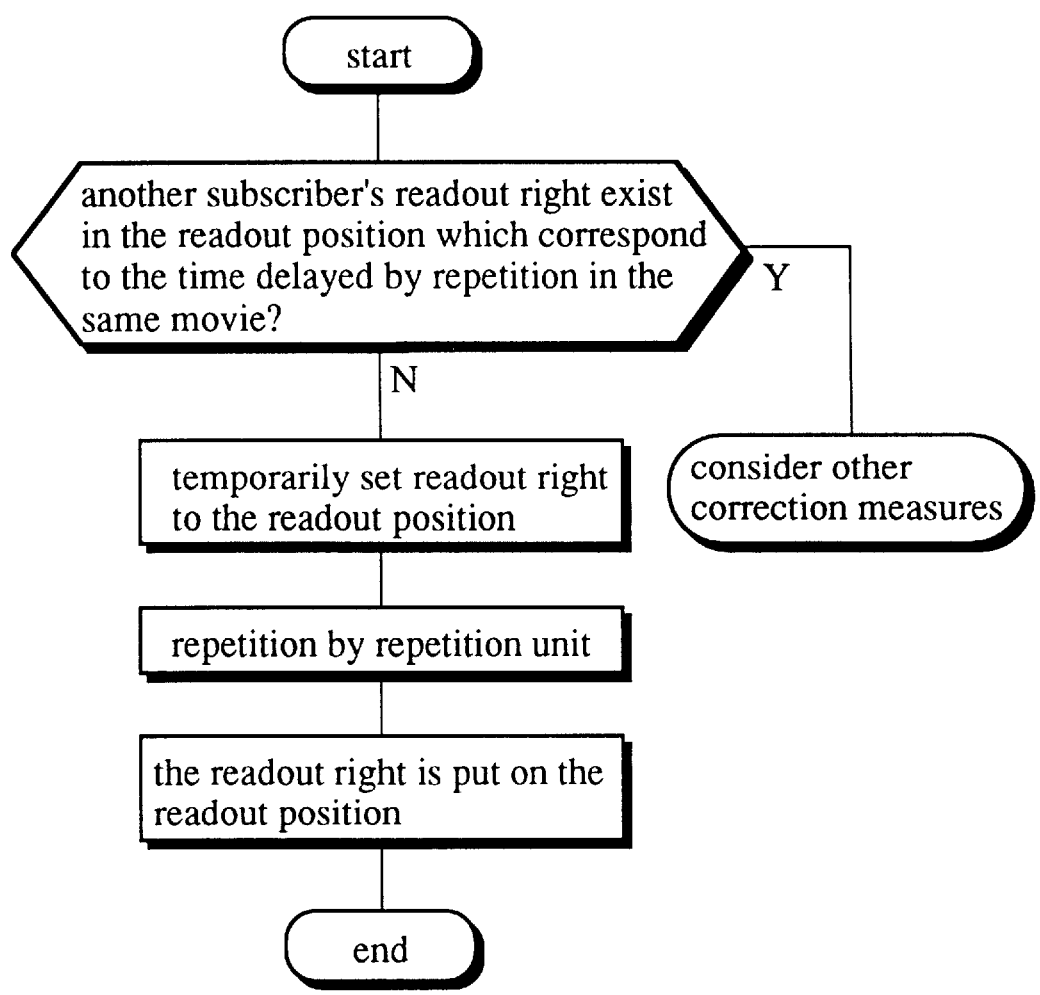
FIG. 34 shows a flowchart depicting the overall operations when the repetition is selected first as an unbalance correction.

FIG. 34 is a flowchart showing the operations when the repetition is selected as an unbalance correction. The repetition is given priority because it is more popular among subscribers than other methods, and no sponsor may be found for a commercial message to be inserted.

Only one of these methods may be used for adjusting time. Two different image data sections may be overlapped to reduce the time. In the case that image data are stored as analog data, this is easily done by lowering the intensity of each image data section after they are overlapped.

In the present embodiment, disks storing the positions where the fade-in or fade-out can be applied are supposed to store the fade-in or fade-out image data sections. The image process unit 28 may be designed to change the digital value of the stored image data sections in order to raise or lower the intensity of each primary color consisting of the image data sections. The image process unit 28 also may be designed to make a scene with no image be displayed in the beginning or ending of a new scene. In the case of analog data, the voltage or current of the colors may be lowered to modify the intensity.

Furthermore, the methods for image data readout time adjustment may be selected depending on the types of the image data. For example, in the case of travel guide image data, the insertion of commercial massages may be exclusively used because they can easily get airline companies as sponsors. And in the case of movies, repetition may be used for the reasons already mentioned.

Figure 35:
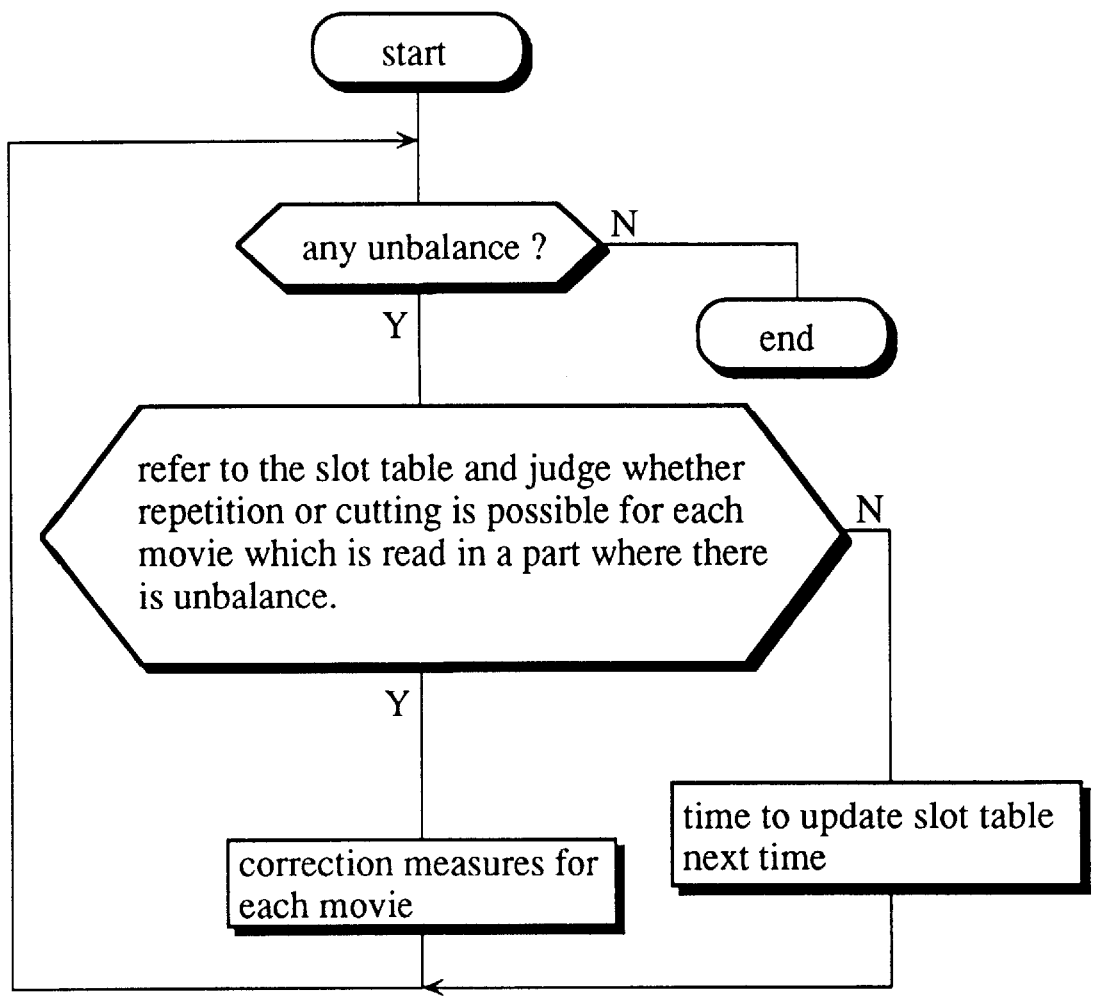
FIG. 35 shows the overall flow of a modified example of the second embodiment.

In addition, subscribers assigned the other slots may be included to the target to assign the readout right and to modify the readout position. FIG. 35 shows the flowchart of the assignment.

In a case that one disk has as many as twenty or thirty slots, at least two or three slots may be kept free. This would lead to the reduction of restrictions to the forwarding or rewinding operations which result from that image data is compressed.

The unbalance detection may be intended for only one storage medium based on whether all or most slots are used for reading data from the storage medium. Although this causes a delay until the storage medium is assigned such a readout time period, but makes it simple as a program.

The image information to be used for time adjustment when there is an unbalance, may be provided with priorities in accordance with the contents of the movies or guides.

The table in FIG. 23 which shows positions allowing each time adjusting method for each movie may be identified by serial numbers corresponding to image data sections instead of storage area numbers. Both the serial numbers and the storage area numbers may be provided.

<EMBODIMENT 3>

Figure 36:
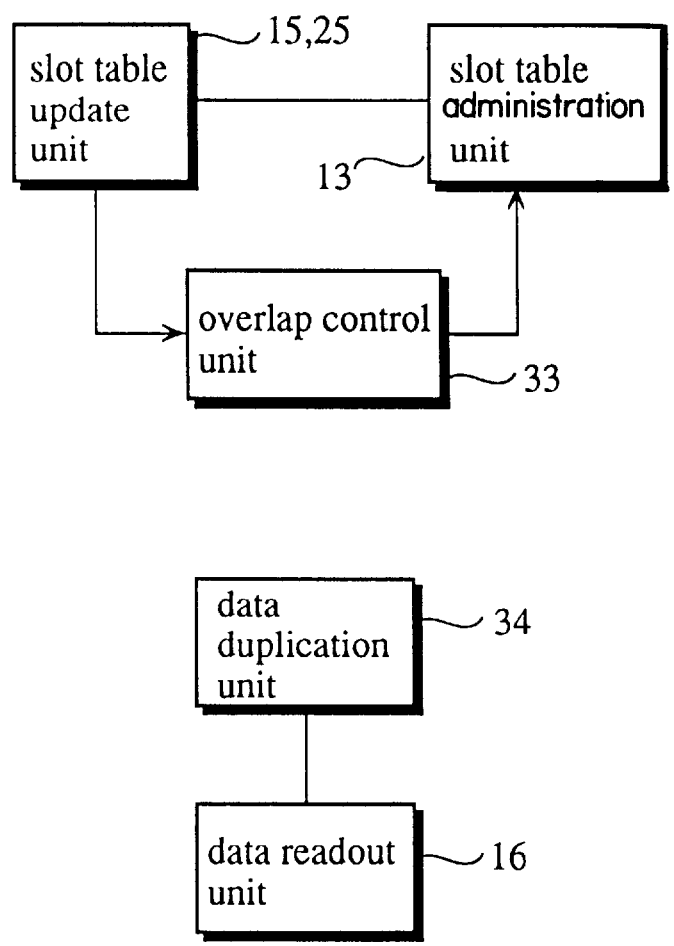
FIG. 36 shows the construction unique to the third embodiment.

Similar to the first and second embodiments, the present embodiment is directed to address a large number of requests for the same movie at the same time. However, the present embodiment is different from the others in that an overlap control unit 33 is connected to the time slot table update units 15 and 25 and further to the slot table administration unit 13, and an image data duplication unit 34 is added to the data readout unit 16 as shown in FIG. 36. Therefore, the following description is focused on the operations of these additional units.

The overlap control unit 33 examines the slot table held in the slot table administration unit 13 at every readout step to find a plurality of subscribers whose readout positions for the same image data section are within a certain range, by examining the slot table in the slot table administration unit 13. If there are any subscribers who are waiting for the readout right, they are included as the target of the examination.

If such subscribers are found, the overlap control unit 33 examines whether there is any image data section that allows the cutting, repetition, fade-in, or fade-out of image data or the insertion of other image data. If there is any, the overlap control unit 33 judges whether the subscribers can be assigned the same readout position by forwarding or delaying at least one subscriber's image data position by using one or more time adjusting methods. To be more specific, the difference between the time period between two consecutive subscribers and the sum of the possible delay time for the former subscriber to be produced by the repetition or the like and the possible forward time for the latter subscriber to be produced by the cutting is compared. Since too many repetitions, cutting, or the like might make subscribers uncomfortable, the number of these operations is restricted.

If it is judged that the same readout position is used, the overlap control unit 33 activates the slot table administration unit 13, the slot table update units 15 and 25, and the image process unit 28, so that the same image data section is distributed to a large amount of subscribers that are watching the same movie.

The slot table update units 15 and 25 and the image process unit 28 controls the addresses of these large number of subscribers by means of an overlap subscriber table provided with the slot table, thereby recognizing each subscriber. Furthermore, the same readout right and readout position are given and updated.

FIG. 37 shows the relationship between the slot table and the overlap subscriber table. In the slot table, the columns for subscribers who are given the readout right are indicated by either W1, W2, or W3 instead of user identification numbers. In the overlap subscriber table, each of W1, W2, and W3 is associated with corresponding user identification numbers.

If the same readout right and readout position are given to a large number of subscribers, the image data duplication unit 34 duplicates as many image data sections read by the data readout unit 16 as the number of overlapped subscribers. The duplicating operation is carried out by amplifying digital data or analog data, dividing them into the entire number of subscribers, and transmitting them with a respective terminal number.

Figure 38:
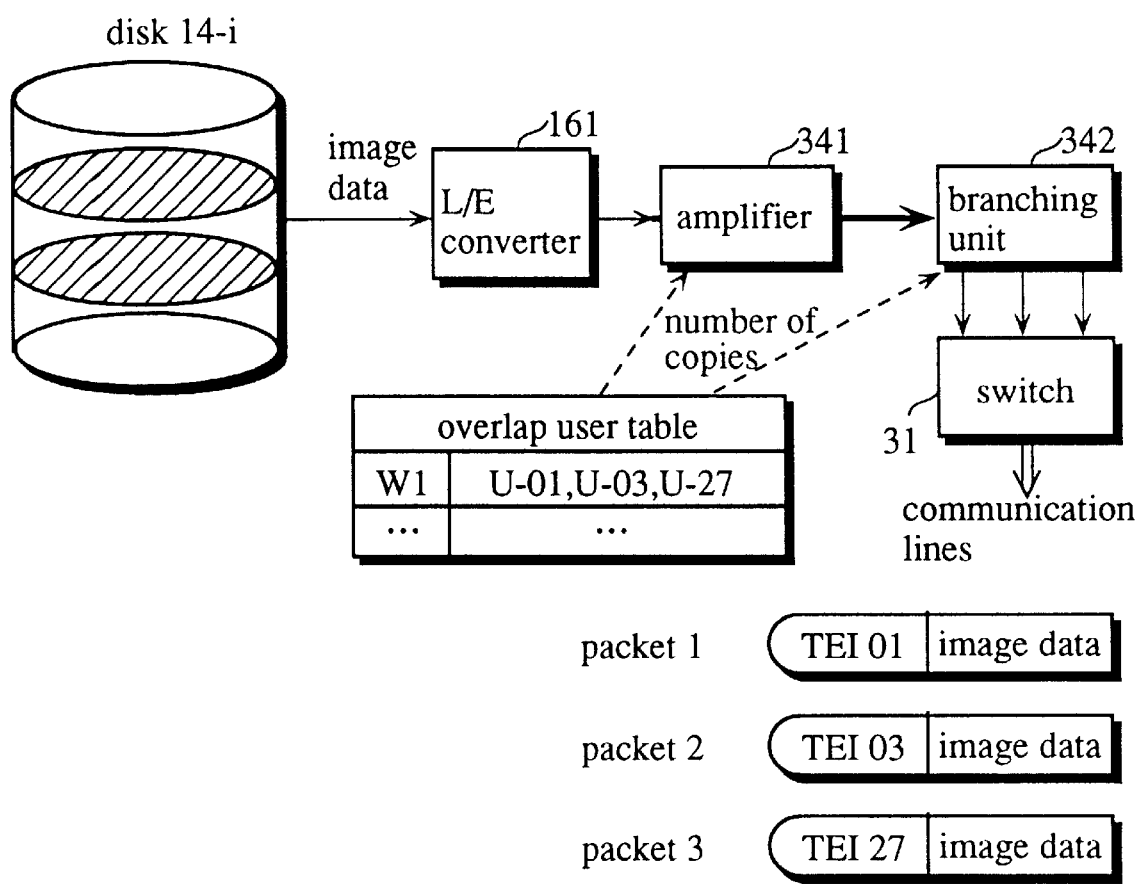
FIG. 38 shows the hardware construction to duplicate digital image data as much as needed.
Figure 39:
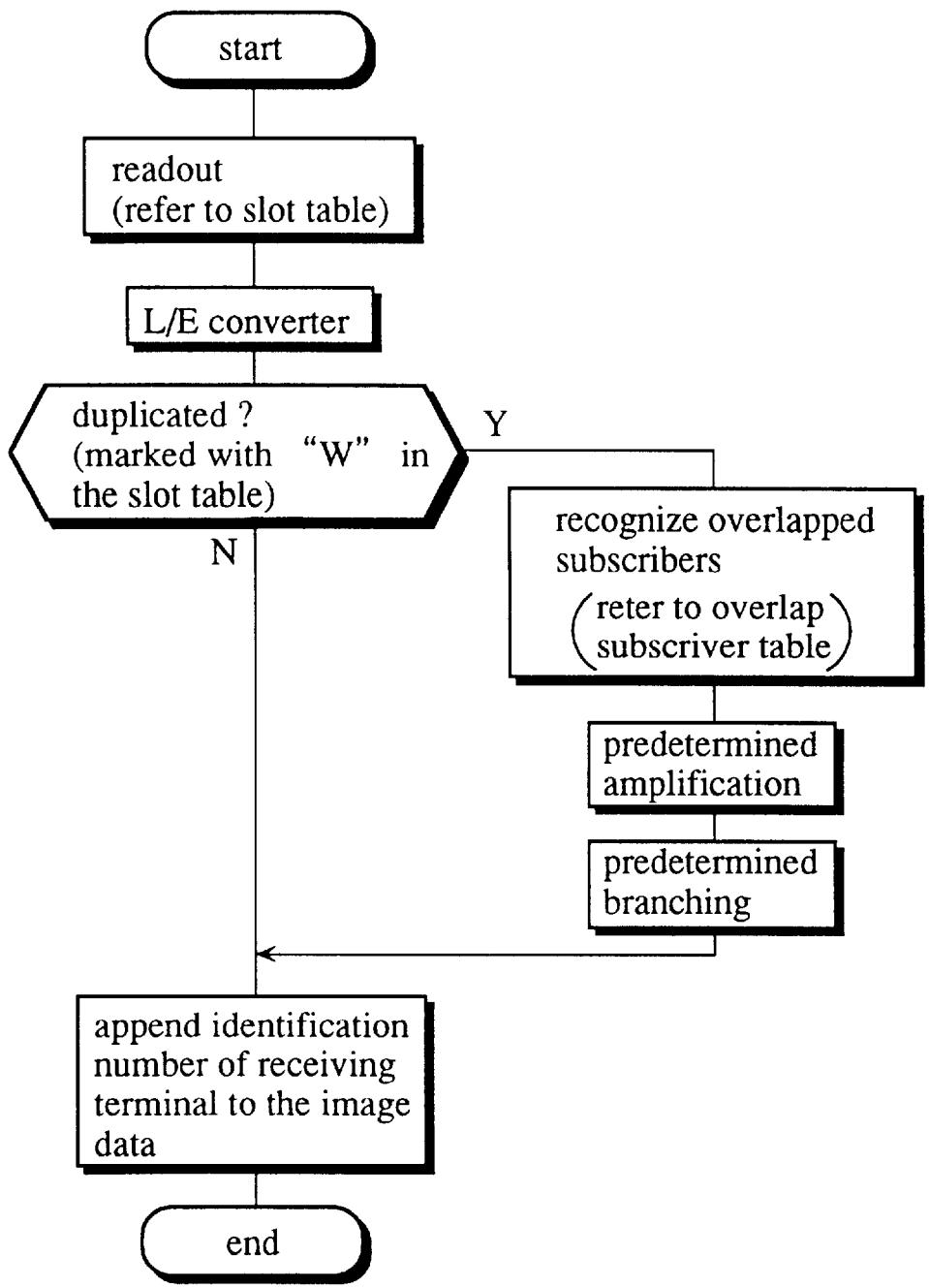
FIG. 39 shows the flowchart of the process for duplicating digital image data for each subscriber.

FIG. 38 shows the hardware construction of the present embodiment. In the construction, image data sections read from the disk (14-i) are converted into electricity by the L/E converter 161, and amplified by the amplifier 341 according to the number of subscribers who are overlapped. The amplified image data sections are then branched by the branching unit 342 and distributed to each subscriber with terminal identification number given by the switch 31 in the manner shown in FIG. 39.

As a result, the same image data section is distributed to each subscriber by the switch 31, and the same movie is distributed to the subscribers waiting for the readout right.

Figure 40:
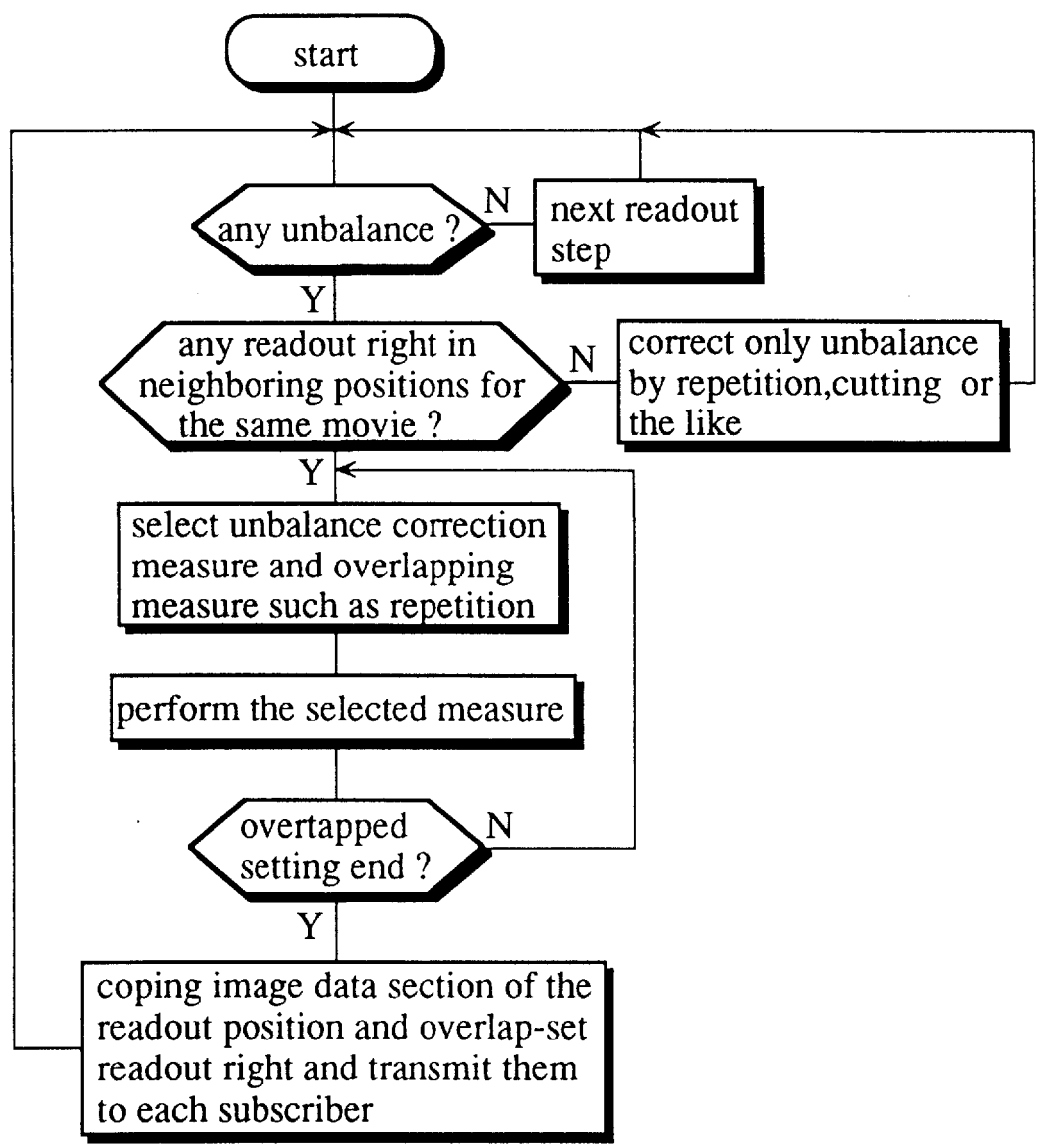
FIG. 40 shows the overall operations of unbalance correction, setting of overlapped readout right and readout positions, duplication and distribution of image data sections.

FIG. 40 shows the overall operations of unbalance correction, setting of overlapped readout right and readout positions, duplication and distribution of image data sections.

The duplication of digital image signals are branched after being duplicated in the present embodiment; however, the digital signals read may be temporality stored in a high-speed semi-conductor memory and the same number of signals as the subscribers who are overlapped may be read. Then, the next image signals may be updated and stored to repeat the same process. In this case, a storage unit for storing image signals corresponding to at least one readout (256 Kbytes), but a branching unit is unnecessary.

It is possible to apply the present embodiment to a plurality of subscribers who are receiving the still picture, waiting for the readout right. Therefore, if there is a request for transmission from a subscriber, only the still picture of a movie may be transmitted for 5 seconds, and if another subscriber sends a request for the same movie within the 5 seconds, the same slot may be assigned to these subscribers to transmit at the same time.

The present invention includes the following variations.

(1) A component essential to the invention may be provided as more than one unit, or a component provided as more than one unit may be combined into one unit for the convenience of the producers.

(2) The still picture to be distributed to the subscribers who are waiting for the readout right or commercial message to be used for preventing unbalanced readout may be stored in, a separate storage medium.

(3) The threshold value of the unbalance detection program can be changed depending on the date and time.

(4) A plurality of image data may be stored for popular movies. In this case, a plurality of image data sections, which are read after a time adjusting method such as cutting or fade-in operation, are intended for the detection.

(5) The time interval that the readout right is assigned and a request from a subscriber is received may be different from the time interval for slot table update.

(6) The image data on service may be educational programs.

(7) Image data and audio data are stored separately. The audio data are stored in different languages not only to address requests for those in a specified language but also to provide international services and to prevent the occurrence of waiting for readout rights or unbalance by making use of time difference among different countries.

(8) Although image data stored in the storage media are explained as digital signals in the embodiments, they can be analog signals sampled and compressed at an equal time interval. Especially, audio data can be analog signals compressed by heightening the frequency, or others.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data readout time adjuster to be used for a video-on-demand system, said video on demand system comprising a storage means for dividing each titled image data into a plurality of image data sections and storing each of the plurality of image data sections in one of a series of storage media in order of reproduction, returning to a first storage medium in the series after reaching a final storage medium in the series along a story of each titled image data; a readout administration means for assigning a slot and a readout right to each subscriber who has made a data transmission request, for designating an image data storage area for each image data section, and for assigning a waiting order to each subscriber who has not been given the readout right; an update means for updating the readout right and the readout position at a certain time interval; a readout means for sequentially reading the plurality of image data sections from the storage media for each subscriber who has been assigned the readout right; and a transmission means for transmitting the plurality of image data sections read to each subscriber, said data readout time adjuster comprising:

a readout time adjusting data storage means for storing image data for adjusting readout time to be provided to subscribers who have not been assigned the readout right and are waiting for a start of a readout operation, the image data for adjusting readout time causing no inconvenience even if a transmission of the image data is interrupted any time;

a readout start position check means for, in response to an additional data transmission request, judging whether a subscriber is assigned a readout right for reading a first image data section of a titled image data requested by the additional data transmission request, wherein said readout start position check means judges that the subscriber is assigned the readout right when there is a free slot in a storage media storing the first image data section of the titled image data; and a readout control means for making at least one of said readout means and a private readout means exclusively provided for said readout time adjusting data storage means read the image data for adjusting readout time stored in said readout time adjusting data storage means until said readout start position check means judges that the subscriber is assigned the readout right, wherein said transmission means transmits the image data for adjusting readout time to the subscriber.

2. A data readout time adjuster included in a video-on-demand system, the video-on-demand system comprising a transmission request receiving means for receiving at least one transmission request for image data from each of a plurality of subscribers; and a transmission means for transmitting the image data requested in the transmission requests to each subscriber, wherein each piece of image data is composed of a plurality of image data sections, said data readout adjuster comprising:

an image data storage means for storing at least one piece of image data and including a certain number of storage mediums which store the plurality of image data sections so that the plurality of image data sections are read in order according to a story of each piece of image data;

a read-out time adjustment image storage means for storing, as a read-out time adjustment image corresponding to the pieces of image data stored in said image data storage means, one of at least one still picture and at least one short-period piece of moving picture data;

a slot table managing means for managing a slot table included in said slot table managing means, the slot table including a plurality of slot areas each of which is related to one of said certain number of storage mediums and also to one of a certain number of slots, wherein each slot area stores subscriber identification information for identifying a subscriber, image identification information for identifying the pieces of image data specified by the transmission requests received by said transmission request receiving means, and read-out time adjustment image identification information for identifying one of addresses of the plurality of image data sections in said certain number of storage mediums and the pieces of image data stored in said image data storage means and read-out time adjustment images;

a slot table updating means including:
  a slide means for, each time an image data section is read from said image data storage means, writing content of each slot area in the slot table to each slot area corresponding to a next storage medium, wherein when each slot area stores the read-out time adjustment image and when a first image data section corresponding to the read-out time adjustment image is stored in a storage medium of a current slot area, said slide means writes an address of the first image data section in the storage medium of the current slot area;
  a free slot area judging means for judging whether there is a free slot area among the plurality of slot areas corresponding to a storage medium which stores the first image data section of the piece of image data specified in the transmission request; and
  a writing means for, when said free slot area judging means judges that there is at least one free slot area, writing the subscriber identification information, the image identification information, and an address of the first image data section of the piece of image data specified in the transmission request into one of the free slot areas judged as free by said free slot area judging means, wherein said writing means, when said free slot area judging means judges that there is no free slot area, writes, into a free slot area for another storage medium, the subscriber identification information, the image identification information, and the read-out time adjustment image identification information corresponding to the piece of image data; and a reading means including a certain number of reading units which respectively correspond to said certain number of storage mediums, wherein each reading unit, based on the subscriber identification information, the image identification information, and one of the read-out time adjustment image identification information and the address of the first image data section, reads and outputs to said transmission means one of the plurality of image data sections of each piece of image data and the read-out time adjustment images respectively from said storage medium corresponding to each reading unit and said read-out time adjustment image storage means.

3. The data readout time adjuster of claim 2 further comprising:
an overlap control means for, each time a piece of image data is read, detecting a plurality of subscribers who request a same piece of image data to be read in a certain time period by referring to the slot table; and
a duplication means for duplicating a same number of image data sections output to said transmission means as a number of the plurality of subscribers detected by said overlap control means, wherein
said transmission means transmits a plurality of image data duplicated by said duplication means to the plurality of subscribers.

4. The data readout time adjuster of claim 2 further comprising:
an audio data insert signal generating means for generating an audio data insert signal when said slot table updating means judges that there is no free slot area among the plurality of slot areas corresponding to a storage medium which stores the first image data section of the piece of image data; and
an audio data inserting means for receiving the audio data insert signal generated by said audio data insert signal generating means, generating audio data, combining the audio data with the read-out time adjustment images read from said read-out time adjustment image storage means, and outputting the combined audio data and read-out time adjustment image to said transmission means, wherein
said transmission means transmits the combined audio data and read-out time adjustment image from the audio data inserting means to the plurality of subscribers.

5. The data readout time adjuster of claim 4 further comprising:
an overlap control means for, each time a piece of image data is read, detecting a plurality of subscribers who request a same piece of image data to be read in a certain time period by referring to the slot table; and
a duplication means for duplicating a same number of image data sections output to said transmission means as a number of the plurality of subscribers detected by said overlap control means, wherein
said transmission means transmits a plurality of image data duplicated by said duplication means to the plurality of subscribers.

6. The data readout time adjuster of claim 2 further comprising:
an unbalance correction information storage means for storing at least one piece of unbalance correction information which respectively corresponds to the pieces of image data stored in said image data storage means;
an image data managing means for storing a position between neighboring image data section at which a piece of unbalance correction information is to be inserted, wherein said image data managing means stores the position for each of the pieces of image data stored in said image data storage means;
an unbalance detecting means for judging for each of said certain number of storage mediums whether the subscriber identification information, the image identification information, and the address of the first image data section are stored in each slot area, and outputting a subscriber assignment change request to said slot table updating means when said unbalance detecting means judges that the subscriber identification information, the image identification information, and the address of the first image data section are stored in each slot area, wherein the subscriber assignment change request requests for changing of at least one subscriber assigned to a certain number of slot areas of said storage medium; and
an image processing means for reading a piece of unbalance correction information from the unbalance correction information storage means at the position stored in said image data managing means and outputting the read piece of unbalance correction information to said transmission means, wherein said slot table updating means, when receiving a subscriber assignment change request from said unbalance detecting means, changes the slot area, to which the subscriber is assigned, to a free slot area, and writes into slot area of another storage medium the subscriber identification information, the image identification information, and the piece of unbalance correction information stored in said image data managing means, wherein said reading means reads the subscriber identification information, the image identification information, and the piece of unbalance correction information from the slot table, and wherein said transmission means transmits the piece of unbalance correction information read by said reading means to the plurality of subscribers.

7. The data readout time adjuster of claim 6 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by said overlap control means, wherein said transmission means transmits a plurality of image data duplicated by said duplication means to the plurality of subscribers.

8. The data readout time adjuster of claim 2 farther comprising:

an unbalance correction information storage means for storing at least one piece of unbalance correction information which respectively corresponds to the pieces of image data stored in said image data storage means;

an image data managing means for storing at least one position, inside the plurality of image data sections for each piece of image data stored in said image data storage means, at which a piece of unbalance correction information is to be inserted;

an unbalance detecting means for judging for each of said certain number of storage mediums whether the subscriber identification information, the image identification information, and the address of the first image data section are stored in each slot area, and outputting a subscriber assignment change request to said slot table updating means when said unbalance detecting means judges that the subscriber identification information, the image identification information, and the address of the first image data section are stored in each slot area, wherein the subscriber assignment change request requests for changing of at least one subscriber assigned to a certain number of slot areas of said storage medium; and an image processing means for reading an image data section from said image data storage means according to the image identification information read by said reading means, inserting a piece of unbalance correction information read by said reading means into the image data section at the position stored in said image data managing means, and outputting the image data section with the piece of unbalance correction information inserted to said transmission means, wherein said slot table updating means, when receiving a subscriber assignment change request from said unbalance detecting means, changes the slot area, to which the subscriber is assigned, to a free slot area, and writes into slot area of another storage medium the subscriber identification information, the image identification information, and the piece of unbalance correction information stored in said image data managing means, wherein said reading means reads the subscriber identification information, the image identification information, and the piece of unbalance correction information from the slot table, and wherein said transmission means transmits to the plurality of subscribers a piece of image data including the image data section with the piece of unbalance correction information inserted by the image processing means.

9. The data readout time adjuster of claim 8 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by said overlap control means, wherein said transmission means transmits a plurality of image data duplicated by said duplication means to the plurality of subscribers.

10. The data readout time adjuster of claim 2 further comprising:

an image data managing means for storing a position between neighboring image data section at which a piece of unbalance correction information is to be inserted, wherein said image data managing means stores the position for each of the pieces of image data stored in said image data storage means;

an unbalance detecting means for judging for each of said certain number of storage mediums whether the subscriber identification information, the image identification information, and the address of the first image data section are stored in each slot area, and outputting a subscriber assignment change request to said slot table updating means when said unbalance detecting means judges that the subscriber identification information, the image identification information, and the address of the first image data section are stored in each slot area, wherein the subscriber assignment change request requests for changing of at least one subscriber assigned to a certain number of slot areas of said storage medium; and an image processing means for reading a piece of unbalance correction information from a unbalance correction information storage means at the position stored in said image data managing means and outputting the read piece of unbalance correction information to said transmission means, wherein said image data storage means stores at least one piece of unbalance correction information which respectively corresponds to the pieces of image data stored in said image data storage means, wherein said slot table updating means, when receiving a subscriber assignment change request from said unbalance detecting means, changes the slot area, to which the subscriber is assigned, to a free slot area, and writes into slot area of another storage medium the subscriber identification information, the image identification information, and the piece of unbalance correction information stored in said image data managing means, wherein said reading means reads the subscriber identification information, the image identification information, and the piece of unbalance correction information from the slot table, and wherein said transmission means transmits the piece of unbalance correction information read by said reading means to the plurality of subscribers.

11. The data readout time adjuster of claim 10 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by said overlap control means, wherein said transmission means transmits a plurality of image data duplicated by said duplication means to the plurality of subscribers.

12. The data readout time adjuster of claim 2 further comprising:

an unbalance correction information storage means for storing at least one piece of unbalance correction information which respectively corresponds to the pieces of image data stored in said image data storage means and which is to be transmitted repeatedly;

an image data managing means for storing a position between neighboring image data section at which a piece of unbalance correction information is to be inserted, wherein said image data managing means stores the position for each of the pieces of image data stored in said image data storage means;

an unbalance detecting means for judging for each of said certain number of storage mediums whether the subscriber identification information, the image identification information, and the address of the first image data section are stored in each slot area, and outputting a subscriber assignment change request to said slot table updating means when said unbalance detecting means judges that the subscriber identification information, the image identification information, and the address of the first image data section are stored in each slot area, wherein the subscriber assignment change request requests for changing of at least one subscriber assigned to a certain number of slot areas of said storage medium; and an image processing means for reading a piece of unbalance correction information from the unbalance correction information storage means at the position stored in said image data managing means, generating a plurality of copies of the read piece of unbalance correction information, and outputting the generated plurality of pieces of unbalance correction information to said transmission means, wherein said slot table updating means, when receiving a subscriber assignment change request from said unbalance detecting means, changes the slot area, to which the subscriber is assigned, to a free slot area, and writes into slot area of another storage medium the subscriber identification information, the image identification information, and the piece of unbalance correction information stored in said image data managing means, wherein said reading means reads the subscriber identification information, the image identification information, and the piece of unbalance correction information from the slot table, and wherein said transmission means transmits the plurality of pieces of unbalance correction information generated by said image processing means to the plurality of subscribers.

13. The data readout time adjuster of claim 12 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by the overlap control means, wherein said transmission means transmits a plurality of image data duplicated by said duplication means to the plurality of subscribers.

14. The data readout time adjuster of claim 2 further comprising:

an unbalance correction information storage means for storing at least one piece of unbalance correction information being fade-in image data which respectively corresponds to the pieces of image data stored in said image data storage means;

an image data managing means for storing a position between neighboring image data section at which a piece of unbalance correction information is to be inserted, wherein said image data managing means stores the position for each of the pieces of image data stored in said image data storage means;

an unbalance detecting means for judging for each of said certain number of storage mediums whether the subscriber identification information, the image identification information, and the address of the first image data section are stored in each slot area, and outputting a subscriber assignment change request to said slot table updating means when said unbalance detecting means judges that the subscriber identification information, the image identification information, and the address of the first image data section are stored in each slot area, wherein the subscriber assignment change request requests for changing of at least one subscriber assigned to a certain number of slot areas of said storage medium; and an image processing means for reading a piece of unbalance correction information being fade-in image data from the unbalance correction information storage means at the position stored in said image data managing means and outputting the read piece of unbalance correction information being fade-in image data to said transmission means, wherein said slot table updating means, when receiving a subscriber assignment change request from said unbalance detecting means, changes the slot area, to which the subscriber is assigned, to a free slot area, and writes into slot area of another storage medium the subscriber identification information, the image identification information, and the piece of unbalance correction information stored in said image data managing means, wherein said reading means reads the subscriber identification Information, the image identification information, and the piece of unbalance correction information from the slot table, and wherein said transmission means transmits the piece of unbalance correction information being fade-in image data output from said image processing means to the plurality of subscribers.

15. The data readout time adjuster of claim 14 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by said overlap control means, wherein said transmission means transmits a plurality of image data duplicated by said duplication means to the plurality of subscribers.

16. The data readout time adjuster of claim 2 further comprising:

an unbalance correction information storage means for storing at least one piece of unbalance correction information being fade-out image data which respectively corresponds to the pieces of image data stored in said image data storage means;

an image data managing means for storing a position between neighboring image data section at which a piece of unbalance correction information is to be inserted, wherein said image data managing means stores the position for each of the pieces of image data stored in said image data storage means;

an unbalance detecting means for judging for each of said certain number of storage mediums whether the subscriber identification information, the image identification information, and the address of the first image data section are stored in each slot area, and outputting a subscriber assignment change request to said slot table updating means when said unbalance detecting means judges that the subscriber identification information, the image identification information, and the address of the first image data sections are stored in each slot area, wherein the subscriber assignment change request requests for changing of at least one subscriber assigned to a certain number of slot areas of said storage medium; and an image processing means for reading a piece of unbalance correction information being fade-out image data from the unbalance correction information storage means at the position stored in said image data managing means and outputting the read piece of unbalance correction information being fade-out image data to said transmission means, wherein said slot table updating means, when receiving a subscriber assignment change request from said unbalance detecting means, changes the slot area, to which the subscriber is assigned, to a free slot area, and writes into slot area of another storage medium the subscriber identification information, the image identification information, and the piece of unbalance correction information stored in said image data managing means, wherein said reading means reads the subscriber identification information, the image identification information, and the piece of unbalance correction information from the slot table, and wherein said transmission means transmits the piece of unbalance correction information being fade-out image data output from said image processing means to the plurality of subscribers.

17. The data readout time adjuster of claim 16 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by said overlap control means, wherein said transmission means transmits a plurality of image data duplicated by said duplication means to the plurality of subscribers.

18. The data readout time adjuster of claim 2 further comprising:

an unbalance correction information storage means for storing at least one piece of unbalance correction information being image effect data which respectively corresponds to the pieces of image data stored in said image data storage means;

an image data managing means for storing at least one position of image data section for which an image effect is performed, wherein the positions of image data section respectively correspond to the pieces of image data stored in said image data storage means;

an unbalance detecting means for judging for each of said certain number of storage mediums whether the subscriber identification information, the image identification information, and the address of the first image data section are stored in each slot area, and outputting a subscriber assignment change request to said slot table updating means when the unbalance detecting means judges that the subscriber identification information, the image identification information, and the address of the first image data section are stored in each slot area, wherein the subscriber assignment change request requests for changing of at least one subscriber assigned to a certain number of slot areas of said storage medium; and an image processing means for reading an image data section from said image data storage means according to the image identification information read by said reading means, reading a piece of unbalance correction information being image effect data from said unbalance correction information storage means, processing the read image data section in accordance with the read piece of unbalance correction information at the position stored in said image data managing means, and outputting the processed image data section to said transmission means, wherein said slot table updating means, when receiving a subscriber assignment change request from said unbalance detecting means, changes the slot area, to which the subscriber is assigned, to a free slot area, and writes into slot area of another storage medium the subscriber identification information, the image identification information, and the piece of unbalance correction information stored in said image data managing means, wherein said reading means reads the subscriber identification information, the image identification information, and the piece of unbalance correction information from the slot table, and wherein said transmission means transmits the processed image data section output from said image processing means to the plurality of subscribers.

19. The data readout time adjuster of claim 18 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by said overlap control means, wherein said transmission means transmits a plurality of image data duplicated by said duplication means to the plurality of subscribers.

20. The data readout time adjuster of claim 2 further comprising:

an image data managing means for storing at least one piece of unbalance correction information each of which indicates a position of an image data section to be cut, wherein the pieces of unbalance correction information respectively correspond ho the pieces of image data stored in said image data storage means; and an unbalance detecting means for judging for each of said certain number of storage mediums whether the subscriber identification information, the image identification information, and the address of the first image data section are stored in each slot area, and outputting a subscriber assignment change request to said slot table updating means when said unbalance detecting means judges that the subscriber identification information, the image identification information, and the address of the first image data section are stored in each slot area, wherein the subscriber assignment change request requests for changing of at least one subscriber assigned to a certain number of slot areas of said storage medium, wherein said slot table updating means, when receiving a subscriber assignment change request from said unbalance detecting means, judges whether said image data managing means stores the pieces of unbalance correction information, and when having judged so, writes a content of a current slot area to a slot area in a next storage medium, and changes the slot area, to which the subscriber is assigned, to a free slot area.

21. The data readout time adjuster of claim 20 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by said overlap control means, wherein said transmission means transmits a plurality of image data duplicated by said duplication means to the plurality of subscribers.

22. A video-on-demand system for receiving at least one transmission request for image data from each of a plurality of subscribers, reading the image data requested in the transmission requests from an inside storage, and for transmitting the read image data to each subscriber, said video-on-demand system comprising:

an image data storage means for storing at least one piece of image data and including a certain number of storage mediums which store the plurality of image data sections so that the plurality of image data sections are read in order according to a story of each piece of image data;

a read-cut time adjustment image storage means for storing, as a read-out time adjustment image corresponding to the pieces of image data stored in said image data storage means, one of at least one still picture and at least one short-period piece of moving picture data;

a slot table managing means for managing a slot table included in said slot table managing means, the slot table including a plurality of slot areas each of which is related to one of said certain number of storage mediums and also to one of a certain number of slots, wherein each slot area stores subscriber identification information for identifying a subscriber, image identification information for identifying the pieces of image data specified by the transmission requests received by said transmission request receiving means, and read-out time adjustment image identification information for identifying one of addresses of the plurality of image data sections in said certain number of storage mediums and the pieces of image data stored in said image data storage means and read-out time adjustment images;

a slot table updating means including:

a slide means for, each time an image data section is read from said image data storage means, writing content of each slot area in the slot table to each slot area corresponding to a next storage medium, wherein when each slot area stores the read-out time adjustment image and when a first image data section corresponding to the read-out time adjustment image is stored in a storage medium of a current slot area, said slide means writes an address of the first image data section in the storage medium of the current slot area;

a free slot area judging means for judging whether there is a free slot area among the plurality of slot areas corresponding to a storage medium which stores the first image data section of the piece of image data specified in the transmission request; and a writing means for, when said free slot area judging means judges that there is at least one free slot area, writing the subscriber identification information, the image identification information, and an address of the first image data section of the piece of image data specified in the transmission request into one of the free slot areas judged as free by said free slot area judging means, wherein said writing means, when said free slot area judging means judges that there is no free slot area, writes, into a free slot area for another storage medium, the subscriber identification Information, the image identification information, and the read-out time adjustment image identification information corresponding to the piece of image data; and a reading means including a certain number of reading units which respectively correspond to said certain number of storage mediums, wherein each reading unit, based on the subscriber identification information, the image identification information, and one of the read-out time adjustment image identification information and the address of the first image data section, reads and outputs to said transmission means one of the plurality of image data sections of each piece of image data and the read-out time adjustment images respectively from said storage medium corresponding to each reading unit and said read-out time adjustment image storage means.

23. The video-on-demand system of claim 22 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by said overlap control means, wherein said transmission means transmits a plurality of image data duplicated by said duplication means to the plurality of subscribers.

24. The video-on-demand system of claim 22 further comprising:

an audio data insert signal generating means for generating an audio data insert signal when said slot table updating means judges that there is no free slot area among the plurality of slot areas corresponding to a storage medium which stores the first image data section of the piece of image data; and an audio data inserting means for receiving the audio data insert signal generated by said audio data insert signal generating means, generating audio data, combining the audio data with the read-out time adjustment images read from said read-out time adjustment image storage means, and outputting the combined audio data and read-out time adjustment image to said transmission means, wherein said transmission means transmits the combined audio data and read-out time adjustment image from the audio data inserting means to the plurality of subscribers.

25. The video-on-demand system of claim 24 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by said overlap control means, wherein said transmission means transmits a plurality of image data duplicated by said duplication means to the plurality of subscribers.

26. The video-on-demand system of claim 22 further comprising:

an unbalance correction information storage means for storing at least one piece of unbalance correction information which respectively corresponds to the pieces of image data stored in said image data storage means;

an image data managing means for storing a position between neighboring image data section at which a piece of unbalance correction information is to be inserted, wherein said image data managing means stores the position for each of the pieces of image data stored in said image data storage means;

an unbalance detecting means for judging for each of said certain number of storage mediums whether the subscriber identification information, the image identification information, and the address of the first image data section are stored in each slot area, and outputting a subscriber assignment change request to said slot table updating means when said unbalance detecting means judges that the subscriber identification information, the image identification information, and the address of the first image data section are stored in each slot area, wherein the subscriber assignment change request requests for changing of at least one subscriber assigned to a certain number of slot areas of said storage medium; and an image processing means for outputting a piece of unbalance correction information read by said reading means at the position stored in said image data managing means to said transmission means, wherein said slot table updating means, when receiving a subscriber assignment change request from said unbalance detecting means, changes the slot area, to which the subscriber is assigned, to a free slot area, and writes into slot area of another storage medium the subscriber identification information, the image identification information, and the piece of unbalance correction information stored in said image data managing means, wherein said reading means reads the subscriber identification information, the image identification information, and the piece of unbalance correction information from the slot table, and wherein said transmission means transmits the piece of unbalance correction information read by said reading means to the plurality of subscribers.

27. The video-on-demand system of claim 26 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by said overlap control means, wherein said transmission means transmits a plurality of image data duplicated by said duplication means to the plurality of subscribers.

28. The video-on-demand system of claim 22 further comprising:

an unbalance correction information storage means for storing at least one piece of unbalance correction information which respectively corresponds to the pieces of image data stored in said image data storage means;

an image data managing means for storing at least one position, inside the plurality of image data sections for each piece of image data stored in said image data storage means, at which a piece of unbalance correction information is to be inserted;

an unbalance detecting means for judging for each of said certain number of storage mediums whether the subscriber identification information, the image identification information, and the address of the first image data section are stored in each slot area, and outputting a subscriber assignment change request to said slot table updating means when said unbalance detecting means judges that the subscriber identification information, the image identification information, and the address of the first image data section are stored in each slot area, wherein the subscriber assignment change request requests for changing of at least one subscriber assigned to a certain number of slot areas of said storage medium; and an image processing means for reading an image data section from said image data storage means according to the image identification information read by said reading means, inserting a piece of unbalance correction information read by said reading means into the image data section at the position stored in said image data managing means, and outputting the image data section with the piece of unbalance correction information inserted to said transmission means, wherein said slot table updating means, when receiving a subscriber assignment change request from said unbalance detecting means, changes the slot area, to which the subscriber is assigned, to a free slot area, and writes into slot area of another storage medium the subscriber identification information, the image identification information, and the piece of unbalance correction information stored in said image data managing means, wherein said reading means reads the subscriber identification information, the image identification information, and the piece of unbalance correction information from the slot table, and wherein said transmission means transmits to the plurality of subscribers a piece of image data including the image data section with the piece of unbalance correction information inserted by the image processing means.

29. The video-on-demand system of claim 28 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by said overlap control means, wherein said transmission means transmits a plurality of image data duplicated by said duplication means to the plurality of subscribers.

30. The video-on-demand system of claim 22 further comprising:

an image data managing means for storing a position between neighboring image data section at which a piece of unbalance correction information is to be inserted, wherein said image data managing means stores the position for each of the pieces of image data stored in said image data storage means;

an unbalance detecting means for judging for each of said certain number of storage mediums whether the subscriber identification information, the image identification information, and the address of the first image data section are stored in each slot area, and outputting a subscriber assignment change request to said slot table updating means when said unbalance detecting means judges that the subscribed identification information, the image identification information, and the address of the first image data section are stored in each slot area, wherein the subscriber assignment change request requests for changing of at least one subscriber assigned to a certain number of slot areas of said storage medium; and an image processing means for outputting a piece of unbalance correction information read by said reading means at the position stored in said image data managing means to said transmission means, wherein said image data storage means stores at least one piece of unbalance correction information which respectively corresponds to the pieces of image data stored in said image data storage means, wherein said slot table updating means, when receiving a subscriber assignment change request from said unbalance detecting means, changes the slot area, to which the subscriber is assigned, to a free slot area, and writes into slot area of another storage medium the subscriber identification information, the image identification information, and the piece of unbalance correction information stored in said image data managing means, wherein said reading Means reads the subscriber identification information, the image identification information, and the piece of unbalance correction information from the slot table, and wherein said transmission means transmits the piece of unbalance correction information read by said reading means to the plurality of subscribers.

31. The video-on-demand system of claim 30 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by said overlap control means, wherein said transmission means transmits a plurality of image data duplicated by said duplication means to the plurality of subscribers.

32. The video-on-demand system of claim 22 further comprising:

an unbalance correction information storage means for storing at least one piece of unbalance correction information which respectively corresponds to the pieces of image data stored in said image data storage means and which is to be transmitted repeatedly;

an image data managing means for storing a position between neighboring image data section at which a piece of unbalance correction information is to be inserted, wherein said image data managing means stores the position for each of the pieces of image data stored in said image data storage means;

an unbalance detecting means for judging for each of said certain number of storage mediums whether the subscriber identification information, the image identification information, and the address of the first image data section are stored in each slot area, and outputting a subscriber assignment change request to said slot table updating means when said unbalance detecting means judges that the subscriber identification information, the image identification information, and the address of the first image data section are stored in each slot area, wherein the subscriber assignment change request requests for changing of at least one subscriber assigned to a certain number of slot areas of said storage medium; and an image processing means for generating a plurality of copies of a piece of unbalance correction information read by said reading means at the position stored in said image data managing means and outputting the generated plurality of pieces of unbalance correction information to said transmission means, wherein said slot table updating means, when receiving a subscriber assignment change request from said unbalance detecting means, changes the slot area, to which the subscriber is assigned, to a free slot area, and writes into slot area of another storage medium the subscriber identification information, the image identification information, and the piece of unbalance correction information stored in said image data managing means, wherein said reading means reads the subscriber identification information, the image identification information, and the piece of unbalance correction information from the slot table, and wherein said transmission means transmits the plurality of pieces of unbalance correction information generated by said image processing means to the plurality of subscribers.

33. The video-on-demand system of claim 32 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by the overlap control means, wherein said transmission means transmits a plurality of image data duplicated by said duplication means to the plurality of subscribers.

34. The video-on-demand system of claim 22 further comprising:

an unbalance correction information storage means for storing at least one piece of unbalance correction information being fade-in image data which respectively corresponds to the pieces of image data stored in said image data storage means;

an image data managing means for storing a position between neighboring image data section at which a piece of unbalance correction information is to be inserted, wherein said image data managing means stores the position for each of the pieces of image data stored in said image data storage means;

an unbalance detecting means for judging for each of said certain number of storage mediums whether the subscriber identification information, the image identification information, and the address of the first image data section are stored in each slot area, and outputting a subscriber assignment change request to said slot table updating means when said unbalance detecting means judges that the subscriber identification information, the image identification information, and the address of the first image data section are stored in each slot area, wherein the subscriber assignment change request requests for changing of at least one subscriber assigned to a certain number of slot areas of said storage medium; and an image processing means for outputting to said transmission means a piece of unbalance correction information being fade-in image data read by said reading means at the position stored in said image data managing means, wherein said slot table updating means, when receiving a subscriber assignment change request from said unbalance detecting means, changes the slot area, to which the subscriber is assigned, to a free slot area, and writes into slot area of another storage medium the subscriber identification information, the image identification information, and the piece of unbalance correction information stored in said image data managing means, wherein said reading means reads the subscriber identification information, the image identification information, and the piece of unbalance correction information from the slot table, and wherein said transmission means transmits the piece of unbalance correction information being fade-in image data output from said image processing means to the plurality of subscribers.

35. The video-on-demand system of claim 34 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by said overlap control means, wherein said transmission means transmits a plurality of image data duplicated by said duplication means to the plurality of subscribers.

36. The video-on-demand system of claim 22 further comprising:

an unbalance correction information storage means for storing at least one piece of unbalance correction information being fade-out image data which respectively corresponds to the pieces of image data stored in said image data storage means;

an image data managing means for storing a position between neighboring image data section at which a piece of unbalance correction information is to be inserted, wherein said image data managing means stores the position for each of the pieces of image data stored in said image data storage means;

an unbalance detecting means for judging for each of said certain number of storage mediums whether the subscriber identification information, the image identification information, and the address of the first image data section are stored in each slot area, and outputting a subscriber assignment change request to said slot table updating means when said unbalance detecting means judges that the subscriber identification information, the image identification information, and the address of the first image data section are stored in each slot area, wherein the subscriber assignment change request requests for changing of at least one subscriber assigned to a certain number of slot areas of said storage medium; and an image processing means for outputting to said transmission means a piece of unbalance correction information being fade-out image data read by said reading means at the position stored in said image data managing means, wherein said slot table updating means, when receiving a subscriber assignment change request from said unbalance detecting means, changes the slot area, to which the subscriber is assigned, to a free slot area, and writes into slot area of another storage medium the subscriber identification information, the image identification information, and the piece of unbalance correction information stored in said image data managing means, wherein said reading means reads the subscriber identification information, the image identification information, and the piece of unbalance correction information from the slot table, and wherein said transmission means transmits the piece of unbalance correction information being fade-out image data output from said image processing means to the plurality of subscribers.

37. The video-on-demand system of claim 36 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by said overlap control means, wherein said transmission means transmits a plurality of image data duplicated by said duplication means to the plurality of subscribers.

38. The video-on-demand system of claim 22 further comprising:

an unbalance correction information storage means for storing at least one piece of unbalance correction information being image effect data which respectively corresponds to the pieces of image data stored in said image data storage means;

an image data managing means for storing at least one position of image data section for which an image effect is performed, wherein the positions of image data section respectively correspond to the pieces of image data stored in said image data storage means;

an unbalance detecting means for judging for each of said certain number of storage mediums whether the subscriber identification information, the image identification information, and the address of the first image data section are stored in each slot area, and outputting a subscriber assignment change request to said slot table updating means when the unbalance detecting means judges that the subscriber identification information, the image identification information, and the address of the first image data section are stored in each slot area, wherein the subscriber assignment change request requests for changing of at least one subscriber assigned to a certain number of slot areas of said storage medium; and an image processing means for reading an image data section from said image data storage means according to the image identification information read by said reading means, reading a piece of unbalance correction information being image effect data from said unbalance correction information storage means, processing the read image data section in accordance with the read piece of unbalance correction information at the position stored in said image data managing means, and outputting the processed image data section to said transmission means, wherein said slot table updating means, when receiving a subscriber assignment change request from said unbalance detecting means, changes the slot area, to which the subscriber is assigned, to a free slot area, and writes into slot area of another storage medium the subscriber identification information, the image identification information, and the piece of unbalance correction information stored in said image data managing means, wherein said reading means reads the subscriber identification information, the image identification information, and the piece of unbalance correction information from the slot table, and wherein said transmission means transmits the processed image data section output from said image processing means to the plurality of subscribers.

39. The video-on-demand system of claim 38 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by said overlap control means, wherein said transmission means transmits a plurality of image data duplicated by said duplication means to the plurality of subscribers.

40. The video-on-demand system of claim 22 further comprising:

an image data managing means for storing at least one piece of unbalance correction information each of which indicates a position of an image data section to be cut, wherein the pieces of unbalance correction information respectively correspond to the pieces of image data stored in said image data storage means; and an unbalance detecting means for judging for each of said certain number of storage mediums whether the subscriber identification information, the image identification information, and the address of the first image data section are stored in each slot area, and outputting a subscriber assignment change request to said slot table updating means when said unbalance detecting means judges that the subscriber identification information, the image identification information, and the address of the first image data section are stored in each slot area, wherein the subscriber assignment change request requests for changing of at least one subscriber assigned to a certain number of slot areas of said storage medium, wherein said slot table updating means, when receiving a subscriber assignment change request from said unbalance detecting means, judges whether said image data managing means stores the pieces of unbalance correction information, and when having judged so, writes a content of a current slot area to a slot area in a next storage medium, and changes the slot area, to which the subscriber is assigned, to a free slot area.

41. The video-on-demand system of claim 40 further comprising:

an overlap control means for, each time a piece of image data is read, detecting a plurality of subscribers who request a same piece of image data to be read in a certain time period by referring to the slot table; and a duplication means for duplicating a same number of image data sections output to said transmission means as a number of the plurality of subscribers detected by said overlap control means, wherein said transmission means transmits a plurality of image data duplicated by said duplication means to the is plurality of subscribers.

* * * * *